United States Patent
Kaneko et al.

(10) Patent No.: US 7,276,876 B2
(45) Date of Patent: Oct. 2, 2007

(54) SYNCHRONOUS MOTOR DRIVING APPARATUS

(75) Inventors: Daigo Kaneko, Hitachi (JP); Yoshitaka Iwaji, Hitachi (JP); Kiyoshi Sakamoto, Hitachi (JP); Tsunehiro Endo, Hitachi (JP); Tomofumi Okubo, Narashino (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 219 days.

(21) Appl. No.: 11/206,211

(22) Filed: Aug. 18, 2005

(65) Prior Publication Data

US 2006/0113948 A1    Jun. 1, 2006

(30) Foreign Application Priority Data

Nov. 30, 2004    (JP)    ............... 2004-345556

(51) Int. Cl.
*H02P 27/04*    (2006.01)
(52) U.S. Cl. ............ 318/716; 318/521; 318/700; 318/710; 318/712
(58) Field of Classification Search ........... 318/716, 318/521, 700, 710, 712
See application file for complete search history.

(56) References Cited

U.S. PATENT DOCUMENTS 6,320,349 B1 * 11/2001 Kaneko et al. ............ 318/798
6,441,572 B2 * 8/2002 Batzel ....................... 318/254
6,696,812 B2 * 2/2004 Kaneko et al. ............ 318/700

FOREIGN PATENT DOCUMENTS

| JP | 8-13196 | 2/1996 |
|---|---|---|
| JP | 2002-78392 | 3/2002 |

\* cited by examiner

*Primary Examiner*—Rita Leykin
(74) *Attorney, Agent, or Firm*—Antonelli, Terry, Stout & Kraus, LLP.

(57) ABSTRACT

A synchronous motor driving apparatus having a power converter which applies AC variable voltages having variable frequency to a synchronous motor includes a pulsating current application unit for applying pulsating current to the synchronous motor and a magnetic pole position presumption unit. The magnetic pole position presumption unit detects two current values $\Delta Idcp1$ and $\Delta Idcp2$ on the positive side and two current values $\Delta Idcn1$ and $\Delta Idcn2$ on the negative side of the pulsating current and presumes the magnetic pole position of the synchronous motor on the basis of difference between change rates of $\Delta Idcp1 \rightarrow \Delta Idcp2$ and $\Delta Idcp1 \rightarrow \Delta Idcp2$.

20 Claims, 18 Drawing Sheets

FIG. 2A
INSIDE OF MOTOR
FIG. 2B
SATURATION CHARACTERISTIC
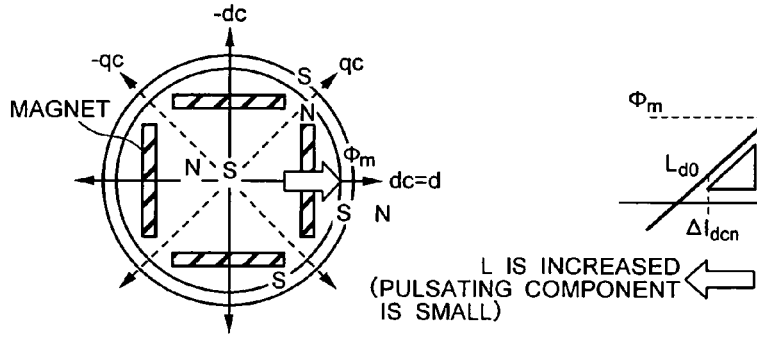
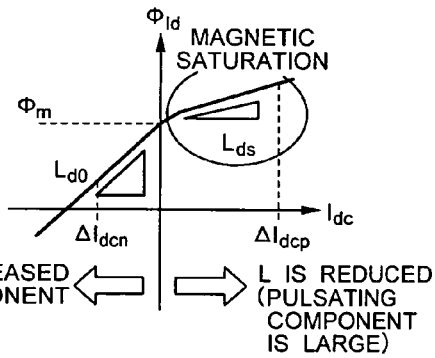
FIG. 2C
CURRENT ON DC AXIS
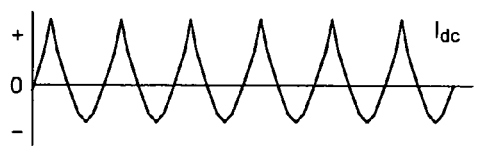
FIG. 2D
INSIDE OF MOTOR
FIG. 2E
SATURATION CHARACTERISTIC
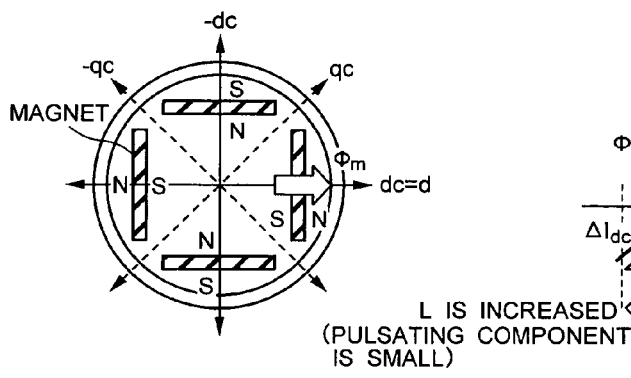
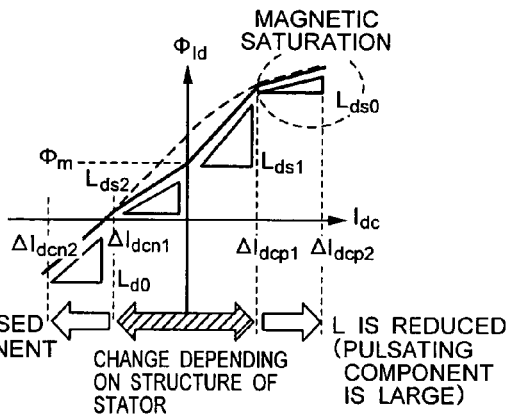
FIG. 2F
CURRENT ON DC AXIS
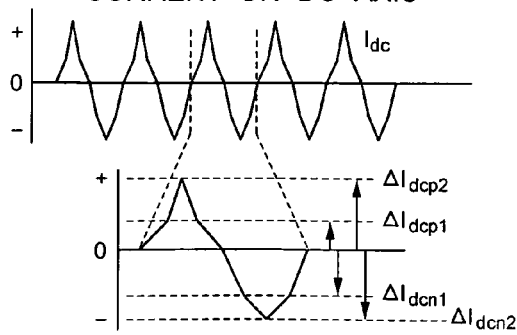

| | H: POSITIVE SIDE OUTPUT VOLTAGE, | | | | L: NEGATIVE SIDE OUTPUT VOLTAGE | | | |
|---|---|---|---|---|---|---|---|---|
| POLARITY OF Vu | L | H | L | L | L | H | H | H |
| POLARITY OF Vv | L | L | H | L | H | L | H | H |
| POLARITY OF Vw | L | L | L | H | H | H | L | H |
| PHASE CURRENT EQUAL TO Ish | NONE | Iu | Iv | Iw | Iu | Iv | Iw | NONE |

SYNCHRONOUS MOTOR DRIVING APPARATUS

BACKGROUND OF THE INVENTION

The present invention relates to a synchronous motor driving apparatus which controls a synchronous motor without using a sensor for detecting an electrical angle position.

There are proposed a lot of methods of presuming an internal magnetic pole position of a synchronous motor to control the synchronous motor without detecting an electrical angle position of a rotor. For example, Japanese Patent Publication JP-A-2002-78392 discloses that voltage pulses are applied to a permanent-magnet synchronous motor (hereinafter referred to as PM motor) in two orthogonal-axis directions to detect amplitudes of current pulses generated in the respective axial directions and presume a magnetic pole position. In this method, an approximation equation showing the relation between the generated currents and the presumed magnetic pole position is introduced to thereby minimize the number of times of application of the voltage pulses, so that the accuracy of the presumption is ensured.

Further, Japanese Patent Publication JP-B-8-13196 (JP-A-3-207250) discloses that positive and negative voltage pulses are applied to three phases to detect amplitudes of current pulses generated in the three phases, so that the magnetic pole position is presumed on the basis of the detected amplitudes. In this method, the accuracy of presumption is limited to the range of ±30 degrees but detection of the current pulses is easily attained by detecting DC current of a power converter.

SUMMARY OF THE INVENTION

These above methods premise the following supposition as described intelligibly in FIGS. 2A to 2F and 3 of the Publication JP-A-2002-78392. That is, when a voltage pulse is applied in the direction that the magnetic flux of magnet is enhanced on a d-axis in which rotor magnet is positioned, the magnetic saturation is relieved and accordingly the inductance is increased to change a current slowly. Consequently, when positive and negative successive pulses are injected or supplied on the d-axis, asynchronous positive and negative currents flow. Accordingly, the symmetry of positive and negative waveforms contained in the current waveform can be examined to thereby observe whether the magnetic flux of magnet is present or not. Change of the current waveform due to influence of the magnetic saturation is detected to thereby detect the position of the magnetic flux of magnet.

However, in fact, the supposition does not sometimes necessarily stand up according to the magnitude of the current Idc due to the rotor structure, the stator slot structure, the winding method and the like of the PM motor. The influence thereof can be solved by increasing the amplitude of the voltage pulse and enhancing the magnetic saturation, although it is restricted by a controller for driving the motor and sufficient magnetic saturation is not necessarily obtained.

It is an object of the present invention to provide a synchronous motor driving apparatus which can presume a magnetic pole position of a synchronous motor with high accuracy without influence exerted by difference in structure of the synchronous motor.

It is another object of the present invention to provide a synchronous motor driving apparatus which can presume a magnetic pole position of a synchronous motor with high accuracy irrespective of structure of the synchronous motor by using only DC current of a power converter for driving the synchronous motor.

According to an aspect of the present invention, the synchronous motor driving apparatus including pulsating current application means for supplying pulsating currents to the synchronous motor through a power converter and magnetic pole position presumption means detects at least two DC currents of the power converter in different phases on each of positive and negative sides of the pulsating currents and presumes the magnetic pole position of the synchronous motor on the basis of the relation in magnitude between the two currents.

According to another aspect of the present invention, change rates of the DC currents of the power converter on each of position and negative sides of the pulsating currents are detected to presume the magnetic pole position of the synchronous motor on the basis of the relation between the two current change rates.

According to the present invention, there can be provided the synchronous motor driving apparatus which can presume the magnetic pole position of the synchronous motor with high accuracy without influence exerted by difference in structure of the synchronous motor.

Other objects and features of the present invention will be apparent from embodiments described below.

BRIEF DESCRIPTION OF THE DRAWINGS

FIGS. 2A to 2F are diagrams illustrating the relation of magnetic flux of magnet of the synchronous motor and current generated thereby describing the principle of the present invention as the relation of magnetic saturation and current ripple at time that the magnetic pole axis coincides with a presumption axis;

DESCRIPTION OF EMBODIMENTS

Embodiments of the present invention are now described with reference to the accompanying drawings.

Embodiment 1

Figure 1:
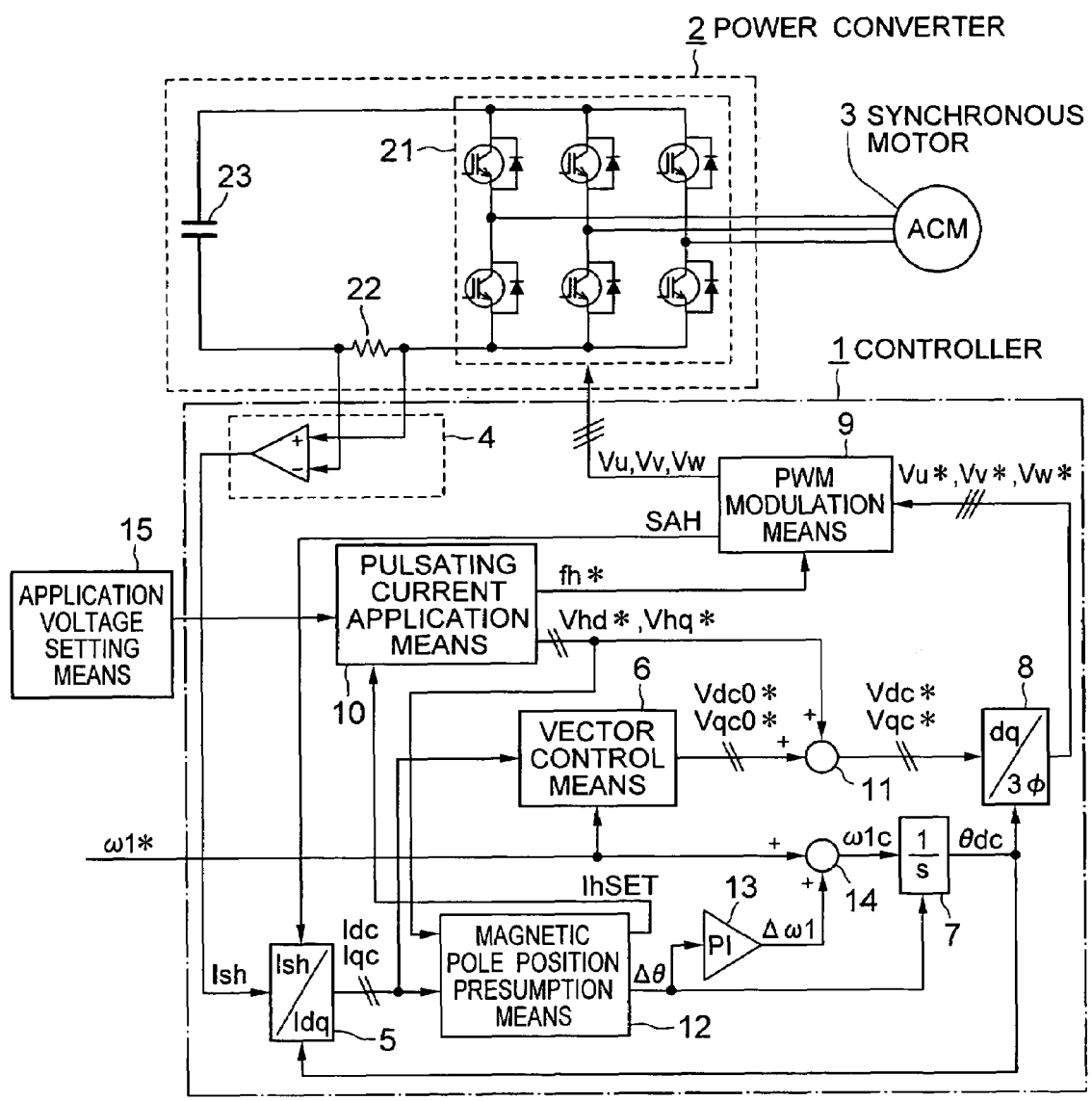
FIG. 1 is a control block diagram of a synchronous motor driving system according to a first embodiment of the present invention.

FIG. 1 is a control block diagram schematically illustrating a driving apparatus of a permanent-magnet synchronous motor (PM motor) according to a first embodiment of the present invention. The driving apparatus includes, broadly divided, a controller 1 for controlling the whole of the driving apparatus of the PM motor, a power converter 2 for supplying AC variable voltages having variable frequency to the PM motor and a three-phase PM-motor 3, and the controller 1 presumptively calculates a rotor position of the PM motor 3 and controls the rotational speed thereof.

The controller 1 includes the following functional blocks concretely. First, the controller 1 includes a current detector 4 which detects DC current of the power converter 2 and a dq converter 5 which coordinate-converts the detected current value into current values on dc- and qc-axes of the rotating coordinate axes of the controller 1. Then, the controller 1 includes vector control means 6 which calculates application voltages to the PM motor 3 on the basis of a desired speed command or torque command. Further, the controller 1 includes an integrator 7 which integrates an electrical angle frequency $\omega 1c$ of the PM motor 3 to calculate an electrical angle position (or phase) $\theta dc$ and a dq inverse converter 8 which coordinate-converts voltage commands Vdc* and Vqc* on the dc- and qc-axes into three-phase AC voltage commands. Moreover, the controller 1 includes PWM modulation means 9 which produces pulses for controlling the power converter 2 on the basis of the three-phase AC voltage commands. The controller 1 additionally includes pulsating current application means 10 which produces a pulsating current and a first adder 11 which adds voltage signals produced by the pulsating current application means 10 to voltage commands produced by the vector control means 6. Further, the controller 1 characteristically includes magnetic pole position presumption means 12 which calculates an position error (error in a magnetic pole position between the PM motor and the controller) $\Delta\theta$ and speed correction means 13 which calculates a correction amount $\Delta\omega 1$ of the speed command on the basis of the calculated position error $\Delta\theta$. Furthermore, the controller 1 includes a second adder 14 which adds the correction amount $\Delta\omega 1$ of the speed command to a speed command $\omega 1^*$ to calculate the electrical angle frequency $\omega 1c$ and application voltage setting means 15 which sets operation of the pulsating current application means 10.

The power converter 2 includes a main circuit portion 21 which receives signals from the PWM modulation means 9 and produces voltages to supply the voltages to the PM motor 3, a DC resistor 22 for detecting the current and a DC voltage supply 23 for the main circuit portion 21.

The vector control means 6 calculates voltage commands for controlling the PM motor 3 to desired speed or torque. The current detector 4 detects DC current Ish flowing through the DC resistor 22 of the power converter 2. The dq converter 5 uses the detected DC current and a current detection timing set signal SAH from the PWM modulation means 9 to reproduce three-phase AC currents of the PM motor 3. The reproduced three-phase AC currents are converted into currents Idc and Iqc on the dc- and qc-axes of the rotating coordinate axes in the controller. A component in the magnetic pole direction of the PM motor 3 presumed by the controller 1 is defined to Idc and a component orthogonal thereto is defined to Iqc. The vector control means 6 calculates application voltage commands Vdc0* and Vqc0* on the dc- and qc-axes to be supplied to the PM motor 3 so that the components Idc and Iqc are equal to desired values. The voltage commands are converted into three-phase AC values by the dq inverse converter 8 again and are further converted into pulse signals for switching the power converter 2 by the PWM modulation means 9. The power converter 2 is driven by output signals of the PWM modulation means 9 and applies voltages corresponding to the voltage commands calculated by the controller 1 to the PM motor 3.

Incidentally, if a magnetic pole position detector which directly detects a phase $\theta$ (position) of a magnetic pole of the PM motor 3 is provided, three-phase detection currents can be coordinate-converted on the basis of the detected phase and the current Idc on the dc-axis and the current Iqc on the qc-axis are obtained as an excitation current component and a torque current component, respectively. The vector control means 6 is to controls the two current components independently and has a torque current command and an excitation current command for controlling the speed and the torque of the PM motor 3 to desired values. The vector control means 6 changes the voltage commands Vdc0* and Vqc0* so that the current Idc on the dc-axis and the current Iqc on the qc-axis are equal to the torque current command and the excitation current command.

As described above, in order to make the vector control, it is necessary to detect the magnetic pole position of the PM motor. The PM motor driving apparatus according to the present invention presumes the magnetic pole position of the PM motor without using the magnetic pole position detector (sensor-less).

First, the operation principle of presuming the magnetic pole position according to the present invention is described.

FIGS. 2A to 2F are a diagram showing the relation between the magnetic flux φm of magnet and a current Idc generated thereby in a permanent-magnet synchronous motor (PM motor). FIGS. 2A to 2C show the relation of the magnetic flux φm of permanent magnet and the current Idc generated thereby in the one-point current detection method described in the Publication JP-A-2002-78392 and the like. FIG. 2A shows the dc-axis and the direction of the magnetic flux φm of permanent magnet in the PM motor, FIG. 2B shows the relation between the current Idc and the primary magnetic flux φId and FIG. 2C shows a waveform of the current Idc. As shown in FIG. 2A, it is supposed that the dc-axis in which direction a voltage pulse is applied is identical with the direction of the magnetic flux φm of permanent magnet in the PM motor. When the direction of the dc-axis is identical with the direction of the magnetic flux φm of permanent magnet, the direction of the magnetic flux by the current Idc is identical with that of the magnetic flux φm of permanent magnet and it acts so as to enhance the magnetic saturation of an iron core of the PM motor. The inductance Lds at this time is relatively small as compared with the inductance Ldo in case where the direction of the dc-axis is opposite to that of the magnetic flux φm of permanent magnet and the current Idc is changed as shown in FIG. 2C. In the Publication JP-A-2002-78392 and the like, this characteristic is utilized to presume the magnetic pole position of the PM motor from the current Idc.

However, when partial saturation in the stator of the PM motor has an influence, the supposition does not necessarily stand up according to the magnitude of the current Idc and there is the possibility that the presumption error of the magnetic pole position is increased. The influence by the partial saturation depends on even structure of the PM motor and can be reduced relatively if the current Idc is increased, although there is the possibility that it is restricted by the capacity of the controller for driving the PM motor.

FIGS. 2D to 2F shows the relation between the magnetic flux φm of permanent magnet of the PM motor and the current Idc generated thereby to explain the principle of the two-point current detection method according to the present invention. FIGS. 2D to 2F correspond to FIGS. 2A to 2C, respectively. Referring to FIGS. 2D to 2F, description is made to the fact that even if partial saturation of the stator of the PM motor has an influence, the influence of components Lds0 and Ld0 in accordance with the original characteristic of the PM motor is taken out.

First, as shown in FIG. 2E, it is supposed that the partial saturation of the stator has an influence in the PM motor and Lds2<Lds1 in the area where the current Idc is small. At this time, as shown in FIG. 2F, |ΔIdcp2|<|ΔIdcn2| in the absolute value of the current Idc and the current Idc in the negative direction is large. Hence, according to the one-point current detection method of FIGS. 2A to 2C, there is the possibility that it is judged in error that the current Idc is larger in the negative direction than in the positive direction and the inductance is larger in the positive direction.

In contrast, in the embodiment of the present invention, as shown in FIG. 2F, currents at two points on the positive and negative sides are detected and the magnetic pole position is presumed on the basis of the relation in magnitude between two detected currents. For example, since the current change rate between the two points is larger in the positive direction, the original characteristics of inductances Lds0 and Ld0 are taken out. That is, (|ΔIdcp2|−|ΔIdcp1|)> (|ΔIdcn2|−|ΔIdcn1|) and only the characteristics of Lds0 and Ld0 are taken out to make it possible to presume the magnetic pole position with high accuracy.

The above principle is described in further detail.

The current Idc on the dc-axis is changed asymmetrically to the polarity thereof due to influence of the magnetic flux φm of permanent magnet. This reason is that the primary magnetic flux is reduced due to influence of the current Idc and the inductance (L∝dI/dt) is changed. In this connection, when the inductance is Lds0 in the positive direction of the dc-axis and Ld0 in the negative direction of the dc-axis, Lds0<Ld0.

On the other hand, when the current Idc on the dc-axis is small, the structure of the stator and the like of the PM motor, for example, has an influence and the magnetic characteristic is as shown in FIG. 2E in some case. This reason is that, even when the current Idc is small, the partial magnetic saturation occurs in slot teeth of the stator, for example, and so on and in this manner it is often due to structural cause. In FIG. 2D, it is defined that an inductance for a weak current in the positive direction of the dc-axis is Lds1 and that in the negative direction of the dc-axis is Lds2. In FIGS. 2D to 2F, it is supposed that Ld0>Lds2 and Lds1>Lds0. At this time, when the current Idc on the dc-axis is small (ΔIdcn1<Idc<ΔIdcp1), the current Idc is changed in accordance with the inductance Lds1 in the positive direction of the dc-axis and is changed in accordance with the inductance Lds2 in the negative direction of the dc-axis. On the other hand, when the current Idc on the dc-axis is large (Idc<ΔIdcn1 or ΔIdcp1<Idc), the current Idc is changed in accordance with the inductance Lds0 in the positive direction of the dc-axis and is changed in accordance with the inductance Ld0 in the negative direction of the dc-axis. Information of the inductances Lds0 and Ld0 is required to presume the position error Δθ but the magnitudes ΔIdcp2 and ΔIdcn2 of the current Idc on the dc-axis actually detected are influenced by the inductances Lds0 and Lds1 and the inductances Ld0 and Lds2, respectively. The relation of the waveform of the produced current Idc on the dc-axis and the detected current ΔIdcp1, ΔIdcn1, ΔIdcp2 and ΔIdcn2 is as shown in FIG. 2F. In other words, the relation of the pulsating components of the current should be |ΔIdcp2|>|ΔIdcn2| according to the supposition, although on the contrary |ΔIdcp2|≦|ΔIdcn2| and it is apparent that the magnetic pole position cannot be presumed exactly. Accordingly, in order to take out the pulsating components of the current by only the inductances Lds0 and Ld0 which are current components to be used to presume the magnetic pole position, the current change rates |ΔIdcp'| and |ΔIdcn'| are calculated in accordance with the expression (1). Consequently, |ΔIdcp'| is the component of the current Idc of the dc-axis changed in accordance with the inductance Lds0 and |ΔIdcn'| is the component of the current Idc on the dc-axis changed in accordance with the inductance Ld0, so that influence due to changed inductances by the magnetic flux φm of permanent magnet can be presumed as change of the current Idc on the dc-axis.

The presumption operation of the magnetic pole position and the magnetic pole position presumption means 12 of FIG. 1 which is characteristic of the present invention are now described. It is hereinafter supposed that the PM motor 3 is in the stopped state and the phase of the dc-axis at the time that the magnetic pole position is presumed is the U-phase of the stator of the PM motor 3 in the initial state and at this time θdc=0. Further, it is supposed that an output voltage of the power converter 2 is pulse-width modulated.

In order to presume the magnetic pole position, the pulsating current application means 10 produces a dc-axis signal voltage command Vhd* and a qc-axis signal voltage command Vhq* as signal voltages applied to the dc- and qc-axes, respectively. Further, the pulsating current application means 10 also produces a triangular carrier frequency command fh* for performing the pulse width modulation. The first adder 11 adds the dc-axis signal voltage command Vhd* to the voltage command Vdc0* and the qc-axis signal voltage command Vhq* to the voltage command Vqc0* to produce the voltage commands Vdc* and Vqc*, respectively. The voltage commands Vdc* and Vqc* are converted into phase voltage commands Vu*, Vv* and Vw* of three-phase AC amounts by the dq inverse converter 8. Further, the PWM modulation means 9 produces control signals corresponding to phase output voltage commands Vu, Vv and Vw which are pulse-width modulated with modulation frequency fh* to supply the control signals to the power converter 2.

Figure 3:
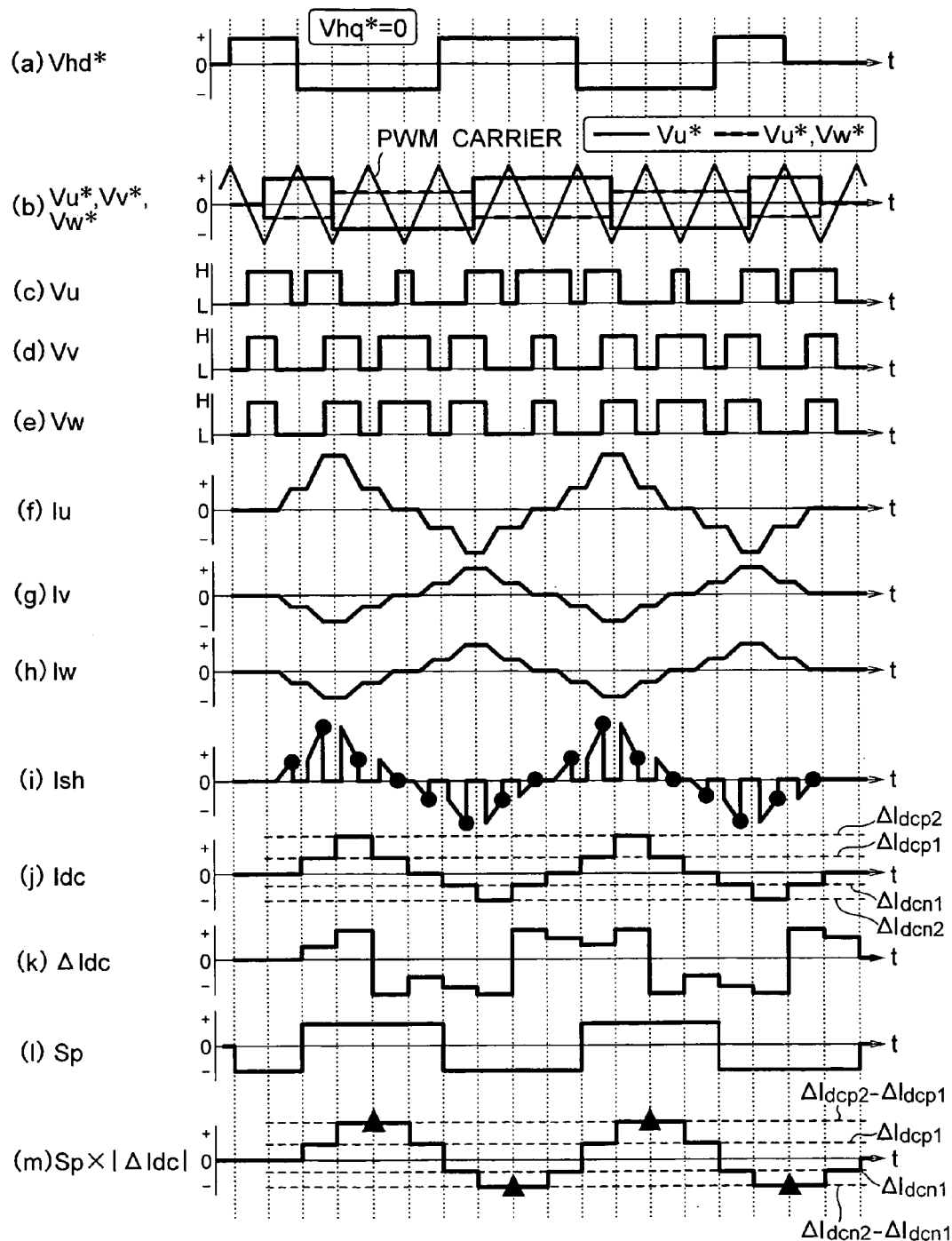
FIG. 3 is a waveform diagram showing operation of each portion in case where a voltage is applied to a dc-axis in the magnetic pole position presumption in the first embodiment of the present invention.
Figure 4:
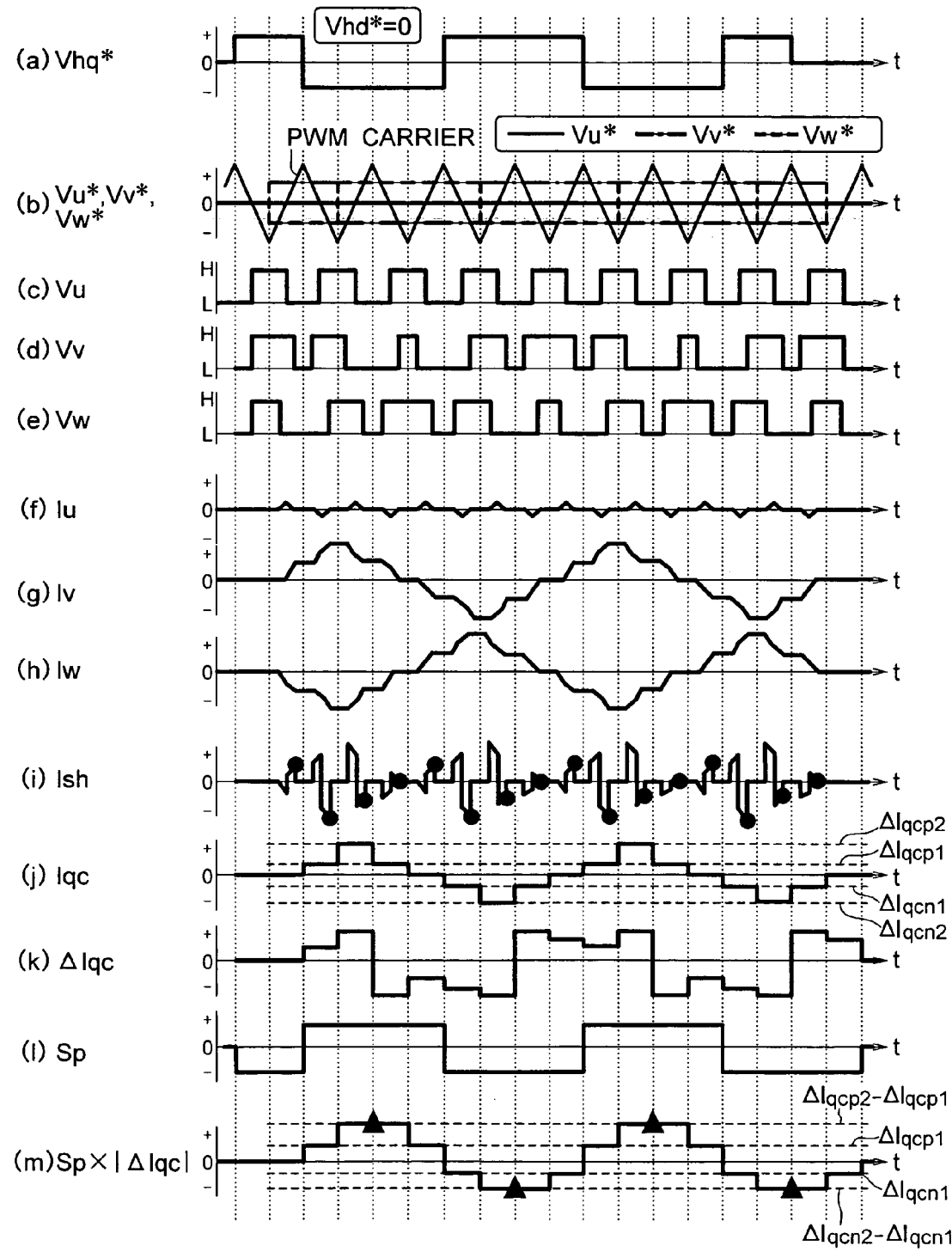
FIG. 4 is a waveform diagram showing operation of each portion in case where a voltage is applied to a qc-axis in the magnetic pole position presumption in the first embodiment of the present invention.

FIGS. 3 and 4 show operation waveforms upon presumption of the magnetic pole position in the embodiment. FIG. 3 shows waveforms in case where the signal voltage command is applied to the dc-axis (Vhq*=0) and FIG. 4 shows waveforms in case where the signal voltage command is applied to the qc-axis (Vhd*=0).

FIG. 3($a$) shows a waveform of the voltage command Vhd*. A triangular wave shown in FIG. 3($b$) is a triangular wave carrier for the pulse width modulation. In the embodiment, it is supposed that the voltage command Vhd* is a square wave having a period which is four times as long as that of the triangular wave carrier and the operation period of the control system is half the period of the triangular wave carrier. At this time, the phase-voltage commands Vu*, Vv* and Vw* produced by the dq inverse converter 8 from voltage command Vhd* converted from two phases into three phases are delayed by a half period of the triangular wave carrier as one operation period of the control system as shown in FIG. 3($b$). This delay is due to control operation. Further, the phase-voltage commands Vu*, Vv* and Vw* are pulse-width modulated by the PWM modulation means 9 to be supplied to the power converter 2 as the phase voltage commands Vu, Vv and Vw as shown in FIGS. 3($c$), ($d$) and ($e$), respectively. The power converter 2 produces phase voltages in substantial synchronism with the phase voltage commands Vu, Vv and Vw. At this time, pulsating currents produced in the PM motor 3 are as shown as phase currents Iu, Iv and Iw in FIGS. 3($f$), ($g$) and ($h$), respectively, and the DC current Ish is as shown in FIG. 3($i$).

In order that the dq converter 5 produces the currents Idc and Iqc, it is necessary to clarify the relation of the DC current Ish and the phase currents Iu, Iv and Iw. The DC current Ish coincides with any of the phase currents Iu, Iv and Iw in accordance with the switching state in respective phases of the power converter 2.

Figures 5, 6:
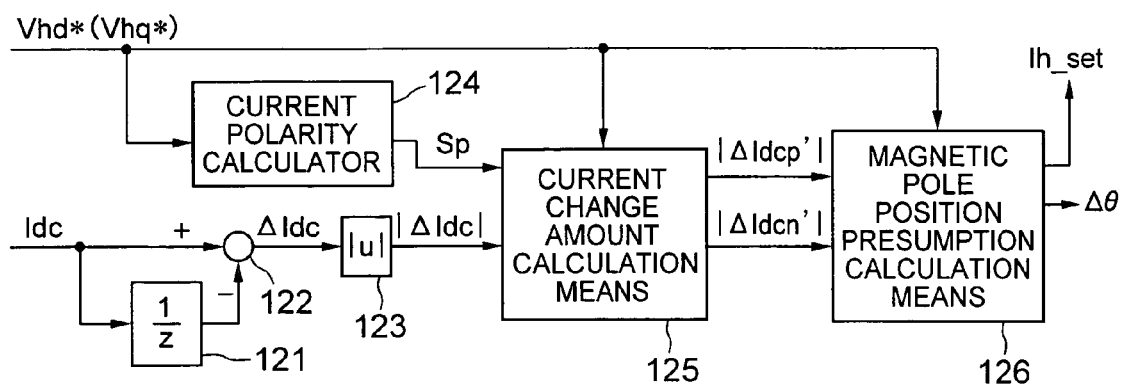
FIG. 5 is a diagram showing the relation of output voltages of a power converter and phase currents flowing through a DC resistor.
FIG. 6 is a functional block diagram illustrating magnetic pole position presumption means in the first embodiment of the present invention.

FIG. 5 is a DC current information diagram showing the relation between the phase voltages Vu, Vv and Vw and the DC current Ish. The DC current Ish is read in while considering the switching state in each phase with reference to FIG. 5, so that the phase currents Iu, Iv and Iw can be detected. In order to obtain an amount of changed current by the pulse-width modulated voltage, the detection timing of the DC current Ish is supposed to be the timing shown by black spots in FIG. 3($i$). This is the timing that the output voltages of the power converter 2 are zero vector, that is, three-phase output voltages are changed to the state that all of three-phase output voltages are equal to one another in positive values (maximum values) or negative values (minimum values). This timing is most separate from the timing that the output voltages of the power converter 2 are changed before and is suitable for detecting the DC current Ish without influence of ringing and the like caused by switching upon change of the output voltages of the power converter 2. Accordingly, by sampling the DC current Ish at this timing, the amount of changed current required for presumption of the magnetic pole position can be obtained from the DC current information. Further, when the switching pattern of the power converter 2 is previously understood, the sampling timing may be used as the time information defined on the basis of the start time for each control period.

The current detection timing set signal SAH is supplied to the dq converter 5 at the timing that the zero vector is outputted. The dq converter 5 calculates the current Idc on the dc-axis shown in FIG. 3($j$) on the basis of the voltage commands Vhd* and Vhq* and the timing set signal SAH produced by the PWM modulation means 9. At this time, different current values at two different timings for each of positive and negative current polarities of ΔIdcp1 and ΔIdcp2 in the positive half wave and ΔIdcn1 and ΔIdcn2 in the negative half wave are obtained.

Referring now to FIG. 6, the presumption method of the magnetic pole position using the detected current values is described.

FIG. 6 is a functional block diagram schematically illustrating the magnetic pole position presumption means 12 of FIG. 1. The magnetic pole position presumption means 12 calculates a first difference value ΔIdc by means of a delay unit 121 and a subtractor 122 on the basis of the d-axis current Idc calculated from the DC current Ish. The first-degree difference value ΔIdc produced by the subtractor 122 is shown in FIG. 3($k$). In the embodiment, an operation delay of one period for current detection occurs. An absolute value calculator 123 is supplied with the first difference value ΔIdc to calculate an absolute value |ΔIdc| thereof. On the other hand, a current polarity calculator 124 calculates a current polarity signal Sp indicative of the polarity of the produced dc-axis current Idc on the basis of the application voltage command Vhd*. The polarity signal Sp is calculated in consideration of the following three delays for the application voltage command Vhd*. That is, (1) a delay time of one operation period of the control system for outputting the pulse-width modulated voltage, (2) a delay time of one period for current detection for calculating the first difference value ΔIdc, and (3) a delay time corresponding one period of the pulsating currents shown in FIGS. 3($f$), ($g$) and ($h$). The polarity signal Sp may be a square-wave signal which is changed at the timing having the delay time corresponding to the total of these delay times. In the embodiment, the current polarity signal Sp is calculated by reversing the polarity of the application voltage command Vhd* as shown in FIG. 3($l$).

A current change amount calculation means 125 of FIG. 6 calculates the current change rates |ΔIdcp'| and |Δ-Idcn'| shown in the following expression (1) in accordance with the following procedure.

$$\Delta Idcp' = \Delta Idcp2 - \Delta Idcp1$$

$$\Delta Idcn' = \Delta Idcn2 - \Delta Idcn1 \qquad (1)$$

Next, the current polarity signal Sp is multiplied by the absolute value |ΔIdc|. Consequently, a signal containing the current change rates |ΔIdcp'| and |ΔIdcn'| is produced as shown in FIG. 3(m). Next, current values at the timing shown by black triangle in FIG. 3(m) are extracted. The timing shown by black triangle may be the timing in the middle of changing polarities of the current polarity signal Sp. Magnetic pole position presumption calculation means 126 calculates the position error Δθ on the basis of the current change rates |ΔIdcp'| and |ΔIdcn'|.

An approximate characteristic as described in the following expression (2), for example, may be applied to the current change rates |ΔIdcp'| and |ΔIdcn'| and the position errorΔθ.

$$|\Delta Idcp'| - |\Delta Idcn'| \propto \cos \Delta\theta \tag{2}$$

In other words, the value of the presumable position error Δθ cannot be distinguished as to whether it is advanced or delayed but its absolute value |Δθ| can be understood.

On the other hand, in the case of Vhd*=0 shown in FIG. 4, the phase voltage commands Vu*, Vv* and Vw*, the phase output voltage commands Vu, Vv and Vw and the phase currents Iu, Iv and Iw can be obtained as shown in FIG. 4 and the qc-axis current Iqc shown in FIG. 4(j) can be calculated on the basis of the current detection timing set signal SAH. The magnetic pole position presumption means 12 treats the qc-axial current Iqc as an input value Idc and makes the same calculation as in the case of Vhq*=0 to thereby obtain the position error Δθ with regard to the qc-axial direction. That is, the position presumption is made on the basis of the pulsating current for each of the dc- and qc-axes in two orthogonal directions and its results can be combined to presume the position error Δθ.

Further, the current change rates are calculated in the same manner as the expression (1) as follows.

$$\Delta Iqcp' = \Delta Iqcp2 - \Delta Iqcp1$$

$$\Delta Iqcn' = \Delta Iqcn2 - \Delta Iqcn1 \tag{3}$$

The following is calculated from its operation result by application of a voltage to the qc-axis.

$$|\Delta Iqcp'| - |\Delta Iqcn'| \propto \cos(\Delta\theta - 90°) = -\sin \Delta\theta \tag{4}$$

The position error |Δθ| can be presumed from the expressions (2) and (4) even if the following expression (5) is used in the same manner as the method described in the Publication JP-A-2002-78392.

$$\Delta\theta = \tan^{-1}\left\{\frac{-(|\Delta Iqcp'| - |\Delta Iqcn'|)}{|\Delta Idcp'| - |\Delta Idcn'|}\right\} \tag{5}$$

As described above, according to the embodiment, the presumption accuracy of the position error Δθ can be enhanced without influence of change in inductance due to structure of the stator and the like of the PM motor.

In the embodiment, the current detection timing set signal SAH is produced at the timing that the zero vector is produced. However, it may be produced at the timing that the output voltage of the power converter 2 is changed from the state of zero vector to the state that one- or two-phase output voltages are changed from the positive value (maximum value) to the negative value (minimum value) or contrary thereto.

Figure 7:
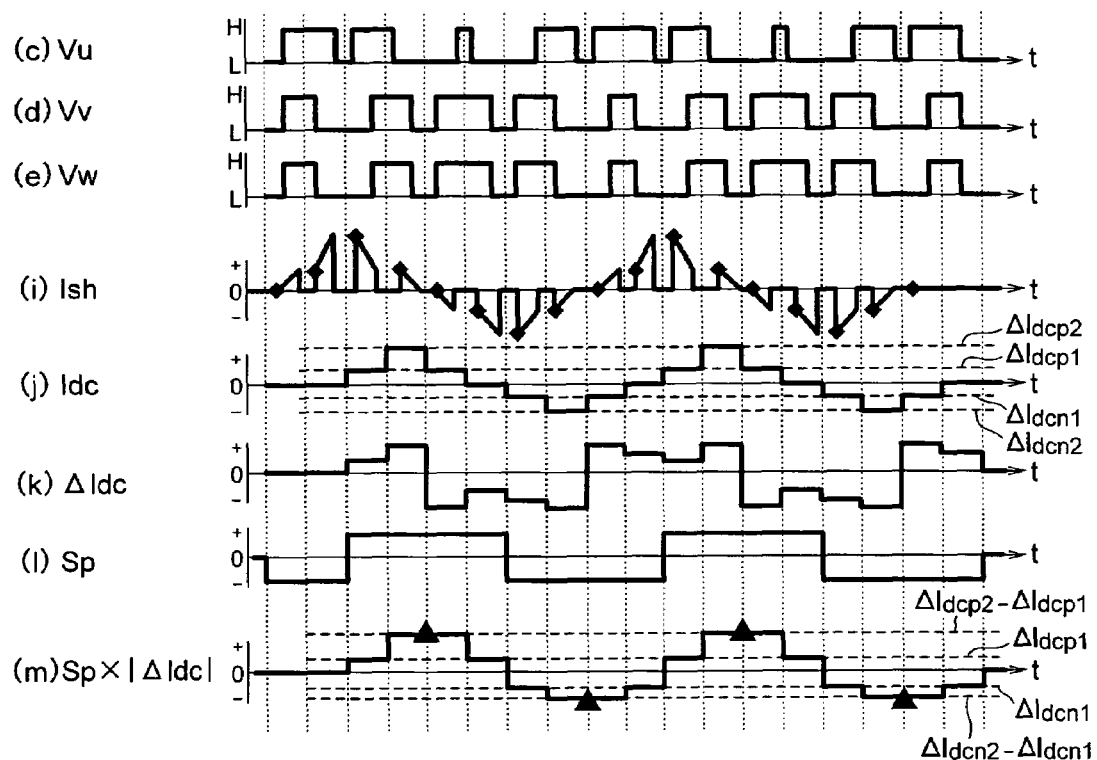
FIG. 7 is a waveform diagram showing operation of each portion of a controller in a modification example of the first embodiment of the present invention.

FIG. 7 shows operation waveforms upon presumption of the magnetic pole position at the above-mentioned timing. In this operation, the phase output voltage commands Vu, Vv and Vw are the same as those of FIG. 3 by way of example. In FIG. 7, only the timing that the DC current Ish is detected is different and the same waveforms as those of FIG. 3 are not shown. When the current detection is made at the timing shown by diamond shapes in FIG. 7(i), the substantially same value as the current Ish at the timing that the zero vector in the control period before one period is outputted is detected as understood from comparison with FIG. 3(i). When influence of ringing or the like caused by switching upon change of the output voltage of the power converter 2 is small, the same detection value as that of FIG. 3(i) is obtained. The waveforms of FIG. 7(j) to (m) showing operation of the magnetic pole position presumption means 12 are understood to be the same as those of FIG. 3 when the current Ish is delayed only one control period as compared with FIG. 3. Accordingly, the configuration of the magnetic pole position presumption means 12 may be identical and operation may be delayed only one control period.

Alternatively, the current detection may be made two or more times within the period that the state of the three-phase output voltages of the power converter 2 is the same, that is, within the period from the time that a certain phase output voltage is changed to the time that a certain phase output voltage is next changed and the current change rate d(Idc)/dt may be calculated directly. In this case, the current change rate d(Idc)/dt can be calculated with high accuracy without influence of attenuation of current caused by resistance contained in the PM motor 3 and generated within the period that the zero vector is outputted.

Figure 8:
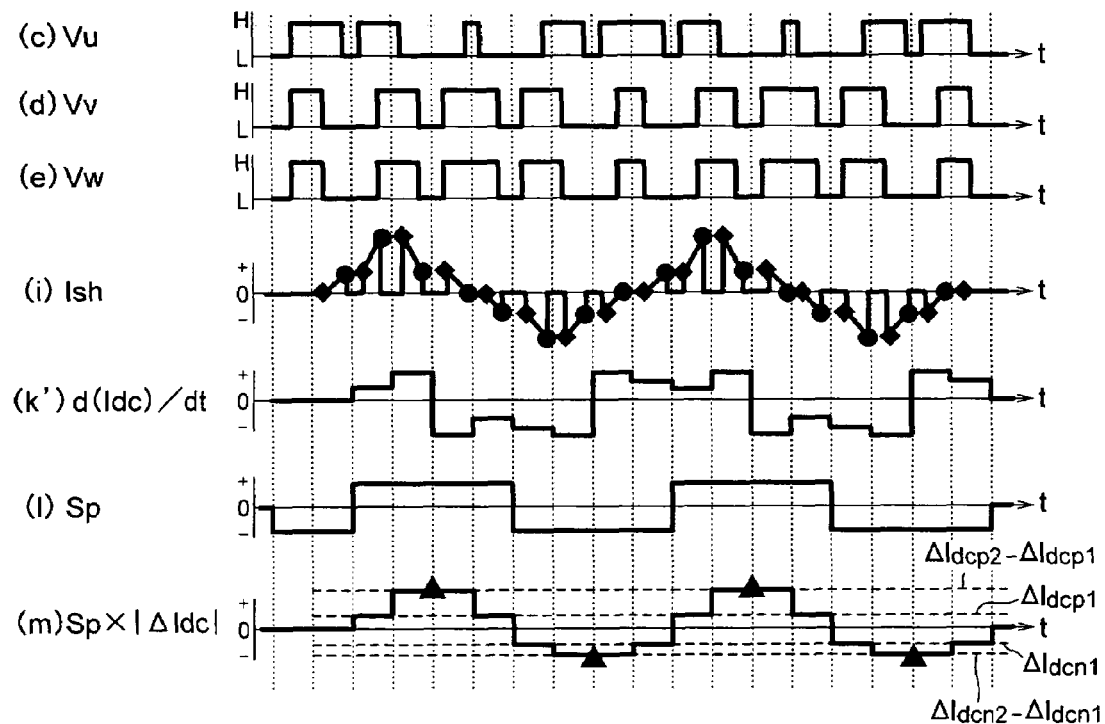
FIG. 8 is a waveform diagram showing operation of each portion of a controller in another modification example of the first embodiment of the present invention.

FIG. 8 shows operation waveforms upon presumption of the magnetic pole position in case where the current detection timing set signal SAH is produced at different timings. That is, FIG. 8 shows the operation waveforms upon presumption of the magnetic pole position in case where the current detection timing set signal SAH is produced not only at the timing that the zero vector is produced but also at the timing that the output voltage of the power converter 2 is changed from the state of zero vector to the state that one- or two-phase output voltages are changed from the positive value (maximum value) to the negative value (minimum value) or contrary thereto. In this operation, the phase output voltage commands Vu, Vv and Vw are the same as those of FIG. 3. Only the timing that the current Ish is detected is different from FIG. 3 and the same waveforms as those of FIG. 3 are not shown. The current detection is made at the timings shown by both of round and diamond shapes in FIG. 8(i). At this case, since the current detection is made twice within the same control period, the current change rate d(Idc)/dt shown in FIG. 8(k') can be calculated directly. Since the current change rate is determined by change in inductance due to the magnetic saturation, the current change rate may be supplied to the absolute value calculator 123 as its input ΔIdc to make the position presumption. From the viewpoint of calculation of the current change rate, the current detection may be made two or more times at any timing as far as influence of Lds0 and Ld0 is taken out.

Further, information of the amplitude and the period of the application voltage commands Vhd* and Vhq* and the pulse width modulation frequency command fh* produced by the pulsating current application means 10 may be previously held in the pulsating current application means 10 as set value information, but means for changing set value information may be provided as follows.

The voltage setting changing means 15 is disposed within the controller 1 or outside of the controller 1 and ensures communication means with the controller 1. When the voltage setting changing means 15 is supplied with information of the amplitude and the period of the application voltage commands Vhd* and Vhq* and the pulse width modulation frequency command fh*, the voltage setting changing means 15 operates to deliver its input result to the pulsating current application means 10. The pulsating current application means 10 changes the application voltage commands Vhd* and Vhq* and the pulse width modulation frequency command fh* to be matched to the delivered input result. Thus, the function that the application voltage supplied by the pulsating current application means 10 can be changed externally can be realized.

Further, when the voltage setting changing means 15 has the function that set values such as constants of the PM motor 3 used in the controller 1 are changed, the pulsating current application means 10 itself may use the set values to change setting of the application voltage commands. For example, when the set values are a rated current value I0M of the PM motor 3, a voltage Vpn of the DC voltage supply 23 of the power converter 2, a pulse width modulation frequency f_PWM and an inductance set value LM* of the PM motor 3, the following expression (6) is utilized.

$$V = -L \times \frac{dI}{dt} \quad (6)$$

In this expression, when dt is supposed to be n times the control period, that is, half of the pulse width modulation period and dI is considered to be the magnitude of the pulse current and is supposed to be k times the rated current value I0M, the following expression is given.

$$Vh^* = \frac{f\_PWM}{n} \times LM^* \times (k \times I0M) \quad (7)$$

Vh* of the expression (7) is a set value of the amplitude of the application voltage commands Vhd* and Vhq* in case where the magnitude of the pulsating current is k×I0M when the application voltage commands Vhd* and Vhq* have the period equal to 2 n times of the pulse width modulation period. The provision of the function that Vh* can be calculated again on the basis of this expression when a set value of the control system is changed can suppress occurrence of overcurrent or undercurrent upon presumption of position and presume the magnetic pole position exactly when the set values of the control system are required to be changed, for example, when the PM motor 3 is changed. Further, when the calculated result of the Vh* exceeds a half of the voltage Vpn, there is the possibility that the application voltage is not set to the command value and the magnetic pole position cannot be presumed exactly. At this time, f_PWM may be reduced or the multiple 2 n of the period of the application voltage to f_PWM may be increased in accordance with this expression. Further, it is not limited that the set inductance value LM* of the PM motor 3 of the set values of the control system is changed by the voltage setting changing means 15 and, for example, when the function that the constants of the PM motor 3 are adjusted automatically is provided, setting of the application voltage commands Vhd* and Vhq* may be changed after automatic adjustment.

Further, both values calculated for Vhq*=0 and Vhd*=0 in the left term |ΔIdcp'|−|ΔIdcn'| of the expression (2) calculated in the position presumption in the magnetic pole position presumption means 12 are sometimes smaller than a predetermined value. It is judged that presumption of the position error Δθ is not made properly since influence of the magnetic flux φm of permanent magnet is not exerted on the dc-axis current Idc sufficiently and the magnetic pole position presumption calculation means 126 produces a voltage adjustment command signal Ihset to supply it to the pulsating current application means 10. The pulsating current application means 10 increases the amplitudes of the application voltage commands Vhd* and Vhq* by a predetermined ratio in accordance with the voltage adjustment command signal Ihset from next time. This configuration can realize the function that the application voltage commands Vhd* and Vhq* are adjusted automatically so that the position error Δθ is presumed exactly.

As described above, by changing the set value information or by providing adjustment means, even if the PM motor 3, for example, is changed, the magnetic pole position can be presumed exactly on the basis of more suitable set value information.

Moreover, for example, when there is abnormality in the controller 1 upon presumption of the magnetic pole position, there is the possibility that the set value information is adjusted or adjustment means regards the abnormality of the controller 1 as the set value information being unsuitable and continues adjustment operation. Accordingly, the controller 1 is made to be operated as follows.

Figure 9:
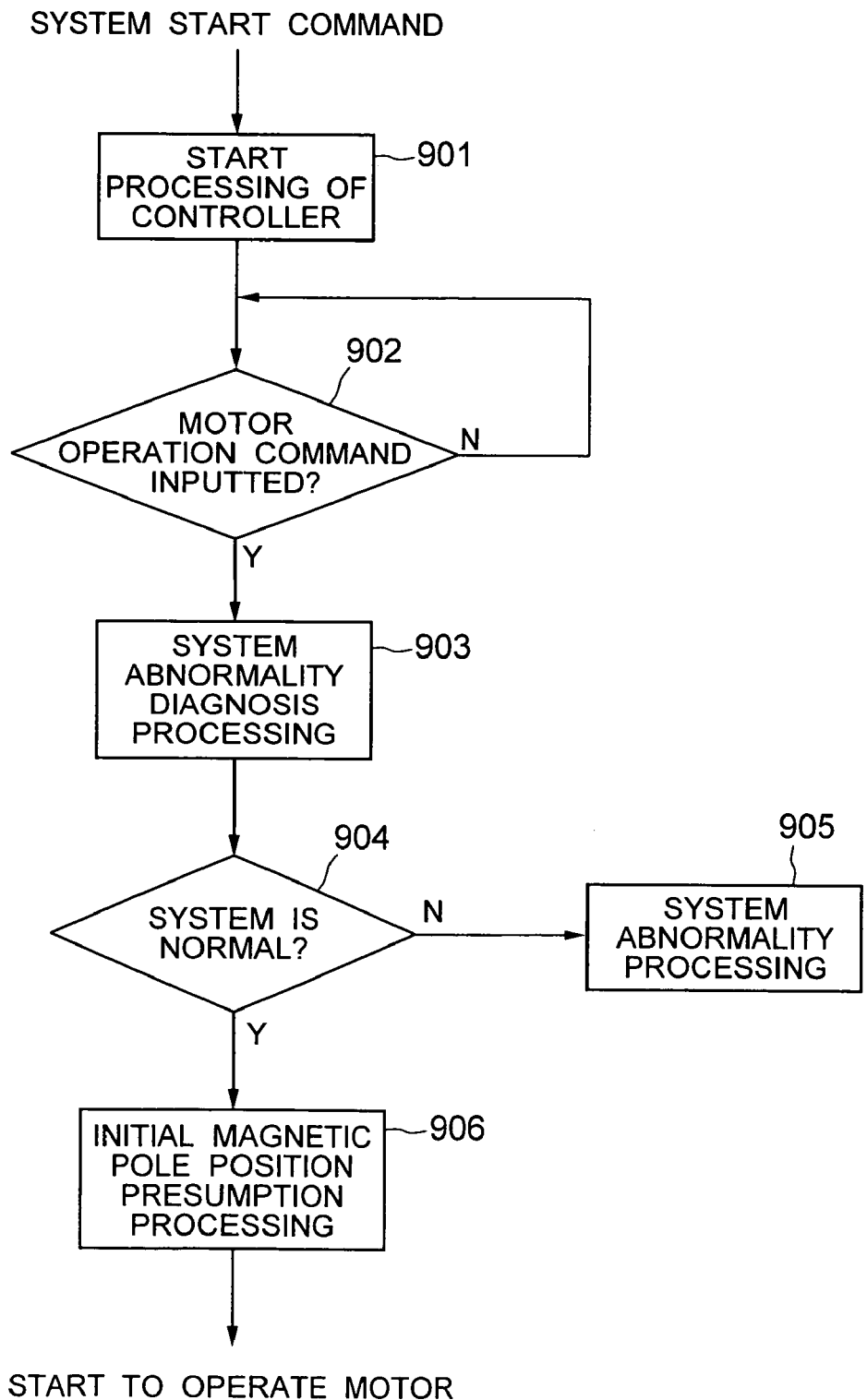
FIG. 9 is a flowchart showing processing of the synchronous motor driving apparatus according to the first embodiment of the present invention.

FIG. 9 is a flowchart showing processing operation of the PM motor driving apparatus according to the first embodiment of the present invention. When a system start command is inputted to the controller 1, start processing 901 of the controller is performed. When the start processing is completed, the controller 1 performs motor operation start command judgment processing 902 and enters in a motor operation start waiting state. When a motor operation start command is inputted to the controller 1, system abnormality diagnosis processing 903 which is characteristic of the embodiment is performed. In the system abnormality diagnosis processing 903, failure such as short circuit, ground fault and disconnection of the output circuit of the power converter 2, unusual state of input voltage such as overvoltage and undervoltage or failure of controller 1 itself is detected. After completion of the system abnormality diagnosis processing 903, when any abnormality is detected in system abnormality state judgment processing 904, processing proceeds to system abnormality processing 905. When any abnormality is not detected, initial magnetic pole position presumption processing 906 is performed in which an initial value of the position error Δθ is presumed by the above-mentioned method and then operation of the motor is started.

The controller 1 can be operated in accordance with the above operation flow to increase the accuracy of the magnetic pole position presumption method according to the present invention.

Embodiment 2

A second embodiment of the present invention is now described. The whole system configuration of the embodiment is the same as that of the first embodiment shown in FIG. 1 and the generation method of the phase output voltage commands Vu, Vv and Vw and operation of the magnetic pole position presumption means 12 of the embodiment are different from those of the first embodiment.

Figure 10:
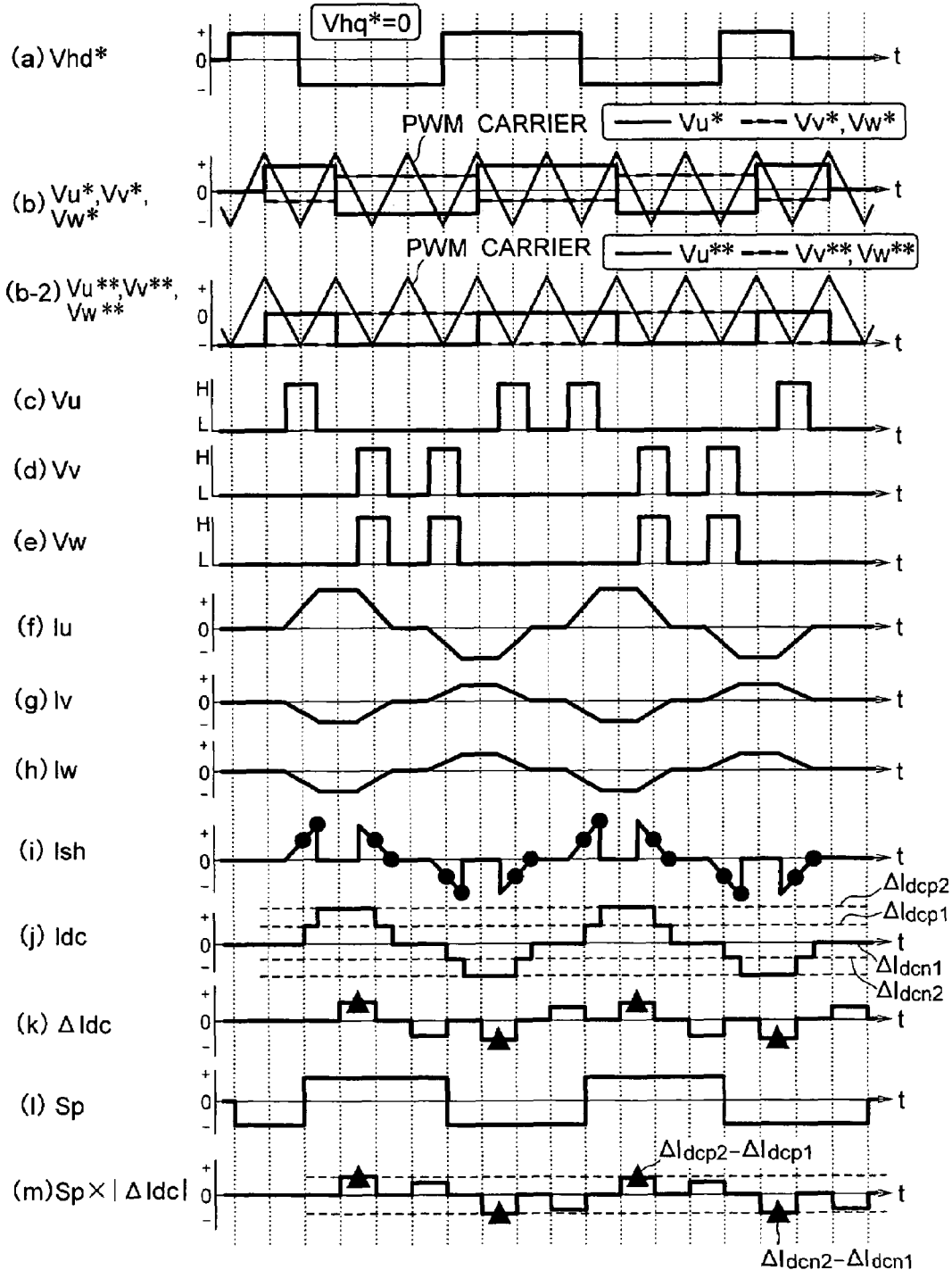
FIG. 10 is a waveform diagram showing operation of each portion in case where a voltage is applied to a dc-axis in the magnetic pole position presumption in a second embodiment of the present invention.
Figure 11:
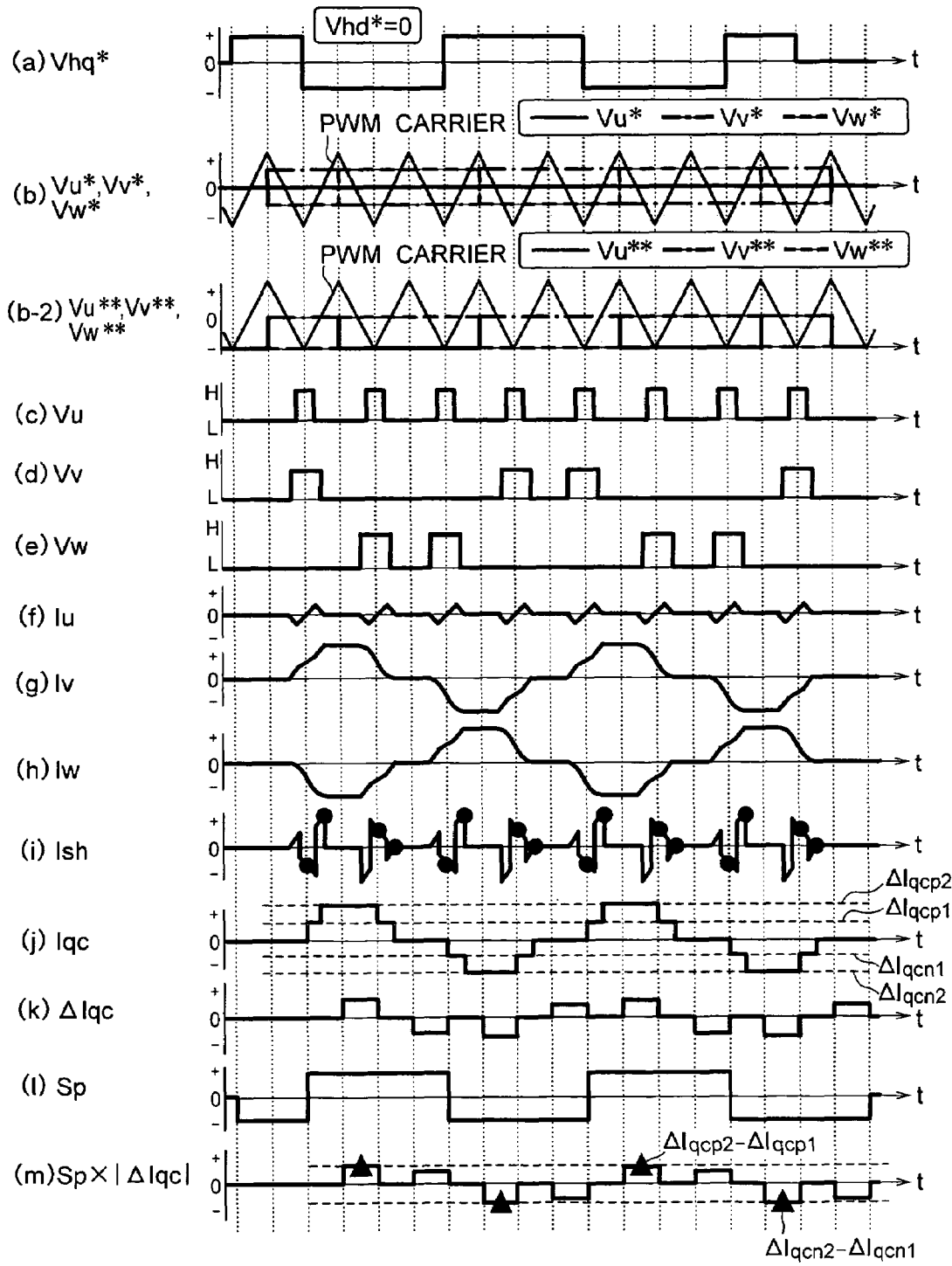
FIG. 11 is a waveform diagram showing operation of each portion in case where a voltage is applied to a qc-axis in the magnetic pole position presumption in the second embodiment of the present invention.

FIG. 10 shows operation waveforms in the embodiment in case where the signal voltage command is applied to only the dc-axis (Vhq*=0) and FIG. 11 shows operation waveforms in the embodiment in case where the signal voltage command is applied to only the qc-axis (Vhd*=0).

FIG. 10(a) shows a waveform of Vhd*. A triangular wave shown in FIG. 10(b) is a triangular wave carrier for the pulse width modulation. In the embodiment, it is supposed that Vhd* is a square wave having a period equal to four times as long as that of the triangular wave carrier and the operation period of the control system is half the period of the triangular wave carrier. At this time, the phase-voltage commands Vu*, Vv* and Vw* produced by the dq inverse converter 8 from voltage command Vhd* converted from two phases into three phases are delayed a half period of the triangular wave carrier as one operation period of the control system as shown in FIG. 10(b) to be produced.

In the embodiment, new phase voltage commands are prepared on the basis of the phase voltage commands Vu*, Vv* and Vw* so that phase voltages which are largest in the negative side are negative-side voltages of the DC voltage supply 23 of the power converter 2 while the line voltage between phases is maintained. That is, in FIG. 10, new command values Vu, Vv and Vw** for the pulse width modulation are calculated by the following expressions as voltage commands with which the pulse width modulation is made actually.

$$Vu^{**}=Vu^{*}-\{Vn-\min(Vu^{*}, Vv^{*}, Vw^{*})\} \quad (8\text{-}1)$$

$$Vv^{**}=Vv^{*}-\{Vn-\min(Vu^{*}, Vv^{*}, Vw^{*})\} \quad (8\text{-}2)$$

$$Vw^{**}=Vw^{*}-\{Vn-\min(Vu^{*}, Vv^{*}, Vw^{*})\} \quad (8\text{-}3)$$

Figure 12:
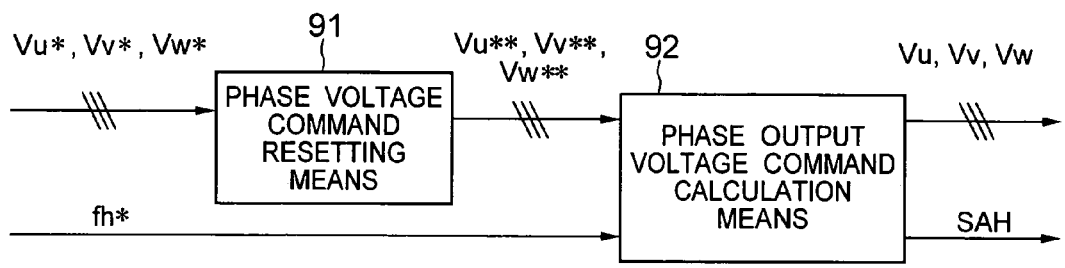
FIG. 12 is a functional block diagram illustrating PWM modulation means in the second embodiment of the present invention.

FIG. 12 is a schematic diagram illustrating the PWM modulation means 9 in the second embodiment of the present invention.

A phase voltage command resetting means 91 calculates the new command values Vu, Vv and Vw for the pulse width modulation in accordance with the expressions (8-1) to (8-3). A phase output voltage command calculation means 92 makes the pulse width modulation for the new command values Vu, Vv for the pulse width modulation and Vw in accordance with the triangular wave carrier as shown in FIG. 10(b-2) and produces the phase output voltage commands Vu, Vv and Vw shown in FIGS. 10(c) to (e) to supply them to the power converter 2. The power converter 2 produces the phase voltages in substantial synchronism with the phase output voltage commands Vu, Vv and Vw. At this time, the pulsating currents in the PM motor 3 are as shown as the phase currents Iu, Iv and Iw in FIGS. 10(f) to (h) and the waveform of the DC current Ish is as shown in FIG. 10(i).

The current detection timing set signal SAH used in the dq converter 5 is prepared as current detection phase information from the phase output voltage commands Vu, Vv and Vw produced by the phase output voltage command calculation means 92 in accordance with FIG. 5. Further, the current detection timing is set to be the timing that the triangular wave carrier is peak, that is, that each control period is started and the timing that the output voltages of the power converter 2 is next changed to the state of zero vector, that is, the state that the polarities of the three-phase output voltages are identical in order to obtain the change amount of the dc-axis current Idc in each control period. The reason that the latter timing is selected is that this timing is most separate from the timing that the output voltages of the power converter 2 are changed and is suitable for detecting the DC current Ish without influence of ringing and the like caused by switching upon change of the output voltages of the power converter 2. The former timing is selected since control processing is easy but it may be any timing from the viewpoint of calculation of the current change rate.

The detection timing of the DC current Ish in the embodiment is shown by black spots in FIG. 10(i). The dq converter 5 calculates the dc-axis current Idc shown in FIG. 10(j) on the basis of the voltage commands Vhd* and Vhq* and the current detection timing set signal SAH produced by the PWM modulation means 9.

Figure 13:
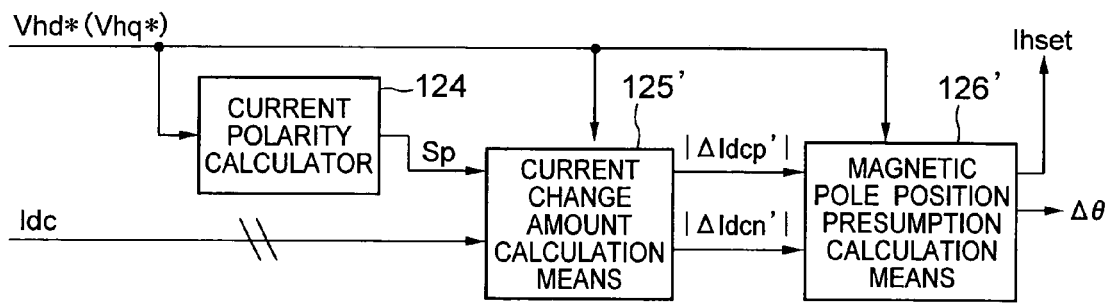
FIG. 13 is a functional block diagram illustrating magnetic pole position presumption means in the second embodiment of the present invention.

Referring now to FIG. 13, the magnetic pole position presumption method based on the detected current value is described.

FIG. 13 illustrates an internal configuration of the magnetic pole position presumption means 12 in the embodiment. $\Delta Idcp1$ and $\Delta Idcp2$ or $\Delta Idcn1$ and $\Delta Idcn2$ are obtained in the same control period in the embodiment. Accordingly, units corresponding to the delay unit 121, the adder 122 and the absolute value calculator 123 shown in FIG. 6 are not provided in the embodiment. A current change amount calculation means 125' calculates $\Delta Idcp'$ or $\Delta Idcn'$ of the expression (1) from $\Delta Idcp1$ and $\Delta Idcp2$ or $\Delta Idcn1$ and $\Delta Idcn2$ shown in FIG. 10(k) on the basis of the dc-axis current Idc obtained in the dq converter 5. The current polarity signal Sp from the current polarity calculator 124 is prepared in the same manner as in the first embodiment. Further, the magnetic pole position presumption calculation expression by magnetic pole position presumption calculation means 126' is the same as that of the magnetic pole position presumption means 126 in the first embodiment and the position error $\Delta\theta$ with regard to the dc-axis direction is obtained.

Further, in case of Vdh*=0, the phase voltage commands Vu*, Vv* and Vw*, the phase output voltage commands Vu, Vv and Vw and the phase currents Iu, Iv and Iw are obtained as shown in FIG. 11 and the qc-axis current Iqc shown in FIG. 11(j) is obtained on the basis of the SAH. The magnetic pole position presumption means 12 treats the qc-axis current Iqc as input value Idc and makes the same calculation as in case of Vhq*=0 to obtain the position error $\Delta\theta$ with regard to the qc-axial direction.

Figure 14:
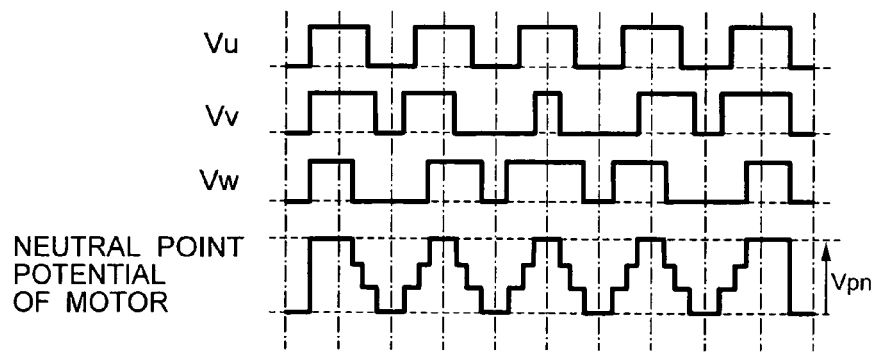
FIG. 14 is a waveform diagram showing neutral point potential of the motor in the first embodiment of the present invention.
Figure 15:
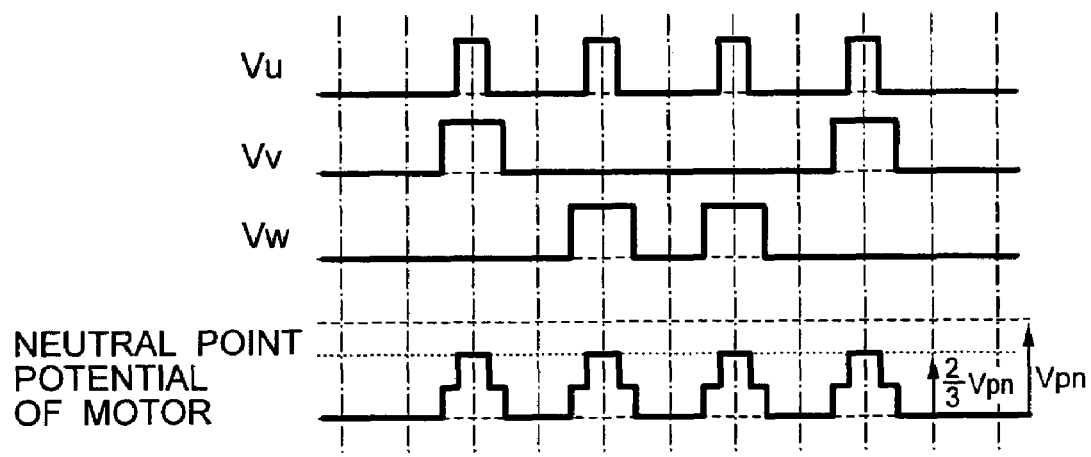
FIG. 15 is a waveform diagram showing neutral point potential of the motor in the second embodiment of the present invention.

FIG. 14 is a diagram showing waveforms of the phase output voltage commands Vu, Vv and Vw and the neutral point potential of the PM motor 3 in the first embodiment and FIG. 15 is a diagram showing waveforms of the phase output voltage commands Vu, Vv and Vw and the neutral point potential of the PM motor 3 in the second embodiment. The neutral point potential of the PM motor 3 is changed with an amplitude equal to one third of the voltage Vpn of the DC voltage supply 23 in response to the phase output voltage commands Vu, Vv and Vw. Accordingly, the neutral point potential of the PM motor 3 is changed with an amplitude of the voltage Vpn of the DC voltage supply 23 in the first embodiment, whereas the neutral point potential of the PM motor 3 is changed with an amplitude equal to two thirds of the voltage Vpn of the DC voltage supply 23 in the second embodiment. Since electromagnetic noise is also increased when the neutral point potential of the PM motor 3 is changed largely, the electromagnetic noise is reduced in the second embodiment as compared with the first embodiment.

As in the embodiment, the phase voltage outputs can be changed to suppress the number of operations of the main circuit 21 of the power converter 2 and further suppress the amplitude of the neutral point potential while making the same position presumption as in the first embodiment and accordingly the electromagnetic noise is reduced greatly. Further, in the embodiment, the phase output voltages are produced in the negative-side potential of the DC voltage supply 23, although even if the phase output voltage commands Vu, Vv and Vw are produced in the positive-side potential of the DC voltage supply 23, the same effects can be attained.

Embodiment 3

A third embodiment of the present invention is now described. The system configuration thereof is the same as that of the first embodiment shown in FIG. 1 and the generation method of the phase output voltage commands Vu, Vv and Vw and operation of the magnetic pole position presumption means 12 in the embodiment are different from those of the first embodiment.

Figure 16:
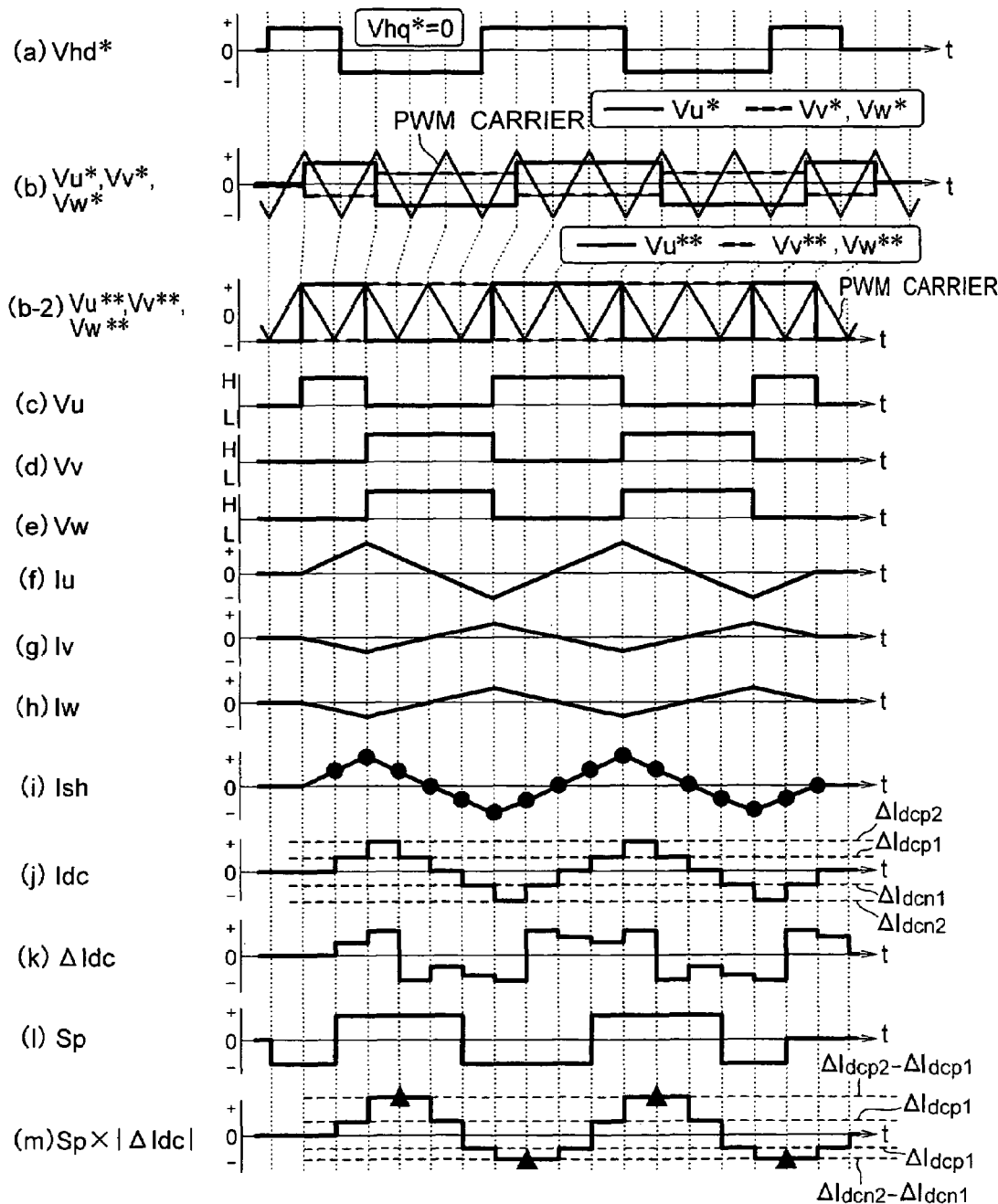
FIG. 16 is a waveform diagram showing operation of each portion in case where a voltage is applied to a dc-axis in the magnetic pole position presumption in a third embodiment of the present invention.
Figure 17:
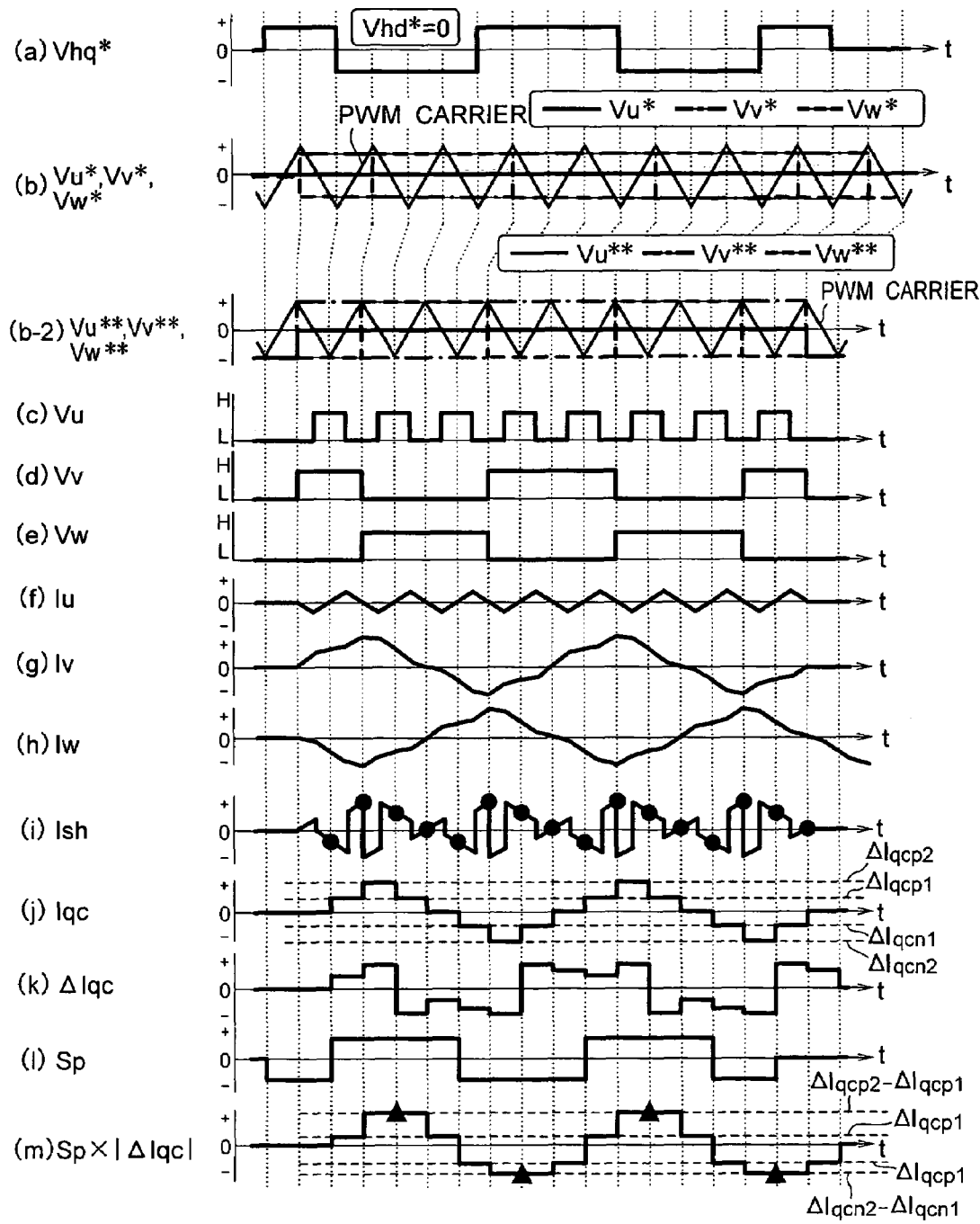
FIG. 17 is a waveform diagram showing operation of each portion in case where a voltage is applied to a qc-axis in the magnetic pole position presumption in the third embodiment of the present invention.

FIG. 16 shows operation waveforms in the embodiment in case where the signal voltage command is applied to only the dc-axis (Vhq*=0) and FIG. 17 shows operation waveforms in the embodiment in case where the signal voltage command is applied to only the qc-axis (Vhd*=0).

In the embodiment, the pulse width modulation frequency f_PWM is changed on the basis of the phase voltage commands Vu*, Vv* and Vw* so that change in voltage between two phases between which the line voltage is maximum is equal to the voltage of the DC voltage supply 23. Further, the phase voltage commands are prepared so that a changed width in the phase voltage commands between two phases between which the line voltage is maximum equal to the voltage of the DC voltage supply 23. In other words, in FIG. 16, a voltage Vu*−Vv* between U- and V-phases is equal to a voltage Vu*−Vw* between V- and W-phases and a voltage Vv*−Vw* between V- and W-phases is zero. On the other hand, a maximum voltage can be produced when the line voltage is equal to the voltage Vpn of the DC voltage supply 23. Accordingly, fh_max* satisfying the following expression may be frequency of new pulsating voltage application commands and fh_max* multiplied by a multiple 2 n of the period of the application voltage to f_PWM may be set as f_PWM newly.

$$(Vu*-Vv*) \times fh* = Vpn \times fh\_max* \quad (9)$$

Further, new voltage commands Vu*, Vv* and Vw* for the pulse width modulation are calculated by the following expressions.

$$Vu** = Vpn \times \text{sign}(Vu*) \quad (10\text{-}1)$$

$$Vv** = Vpn \times \text{sign}(Vv*) \quad (10\text{-}2)$$

$$Vw** = Vpn \times \text{sign}(Vw*)(=Vv**) \quad (10\text{-}3)$$

Figure 18:
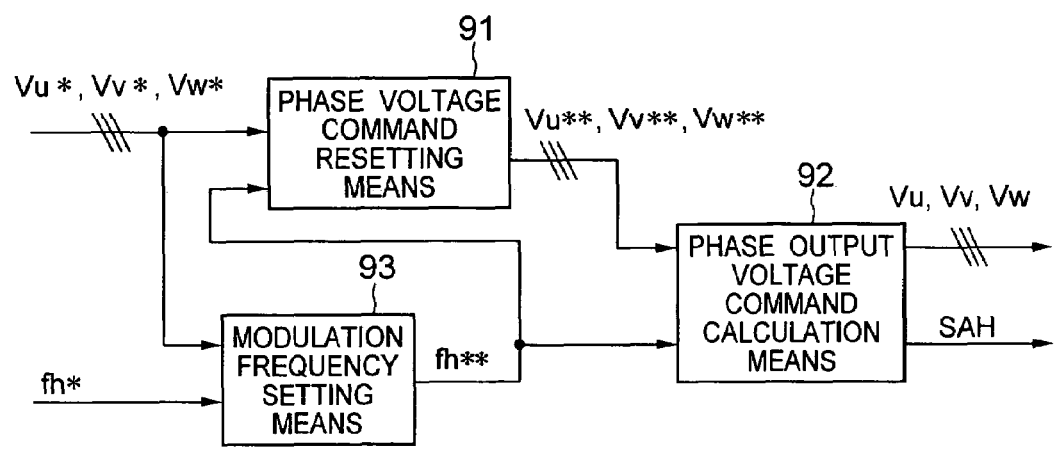
FIG. 18 is a functional block diagram illustrating PWM modulation means in the third embodiment of the present invention.

FIG. 18 is a schematic diagram illustrating the PWM modulation means 9 in the embodiment. First, a modulation frequency setting means 93 calculates a new pulse width modulation frequency command fh in accordance with the expression (9) and the phase voltage command resetting means 91 calculates the new pulse width modulation command values Vu, Vv and Vw in accordance with fh and the expressions (10-1) to (10-3). The phase output voltage command calculation means 92 makes the pulse width modulation to the new pulse width modulation command values Vu, Vv and Vw on the basis of the triangular wave carrier as shown in FIG. 16(b-2) to produce the phase output voltage commands Vu, Vv and Vw as shown in FIGS. 16(c) to (e) and supply them to the power converter 2. The power converter 2 produces the phase voltages in substantial synchronism with Vu, Vv and Vw. At this time, the pulsating currents produced in the PM motor 3 are as shown as phase currents Iu, Iv and Iw in FIGS. 16(f) to (h), respectively, and the DC current Ish is as shown in FIG. 16(i).

The current detection timing set signal SAH used in the dq converter 5 is prepared as current detection phase information from the phase output voltage commands Vu, Vv and Vw produced by the phase output voltage command calculation means 92 in accordance with FIG. 5. Further, the current detection timing is set to the timing that the triangular wave carrier is peak, that is, that each control period is started. At this time, the timing that the switching state of the phase output voltage commands Vu, Vv and Vw is changed coincides with the timing that the triangular carrier is peak. Accordingly, in order to detect the phase currents Iu, Iv and Iw from the DC current Ish, sampling may be made in accordance with DC current information of FIG. 5 just before the timing that the triangular wave carrier is peak.

The detection timing of the DC current Ish in the embodiment is shown by black spots in FIG. 16(i). The dq converter 5 calculates the dc-axis current Idc shown in FIG. 16(j) on the basis of Vhd* and Vhq* and SAH produced by the PWM modulation means 9. The calculation processing in the magnetic pole position presumption after detection of the DC current Ish may be made in the same manner as in the first embodiment and the magnetic pole position presumption is realized as in FIGS. 16(j) to (m) showing its calculation processes.

Further, the processing in case of Vhd*=0 shown in FIG. 17 is the same as in case of Vhd*=0 with the exception that expressions for calculating the new pulse width modulation command values Vu, Vv and Vw are different. The new pulse width modulation command values Vu, Vv and Vw are calculated as follows. Of line voltages to be processed, a voltage Vv*−Vw* between V- and W-phases is maximum and voltages Vu*−Vv* between U- and V-phases and Vu*−Vw* between U- and W-phases are a half of the amplitude of the voltage between V-and W-phases and signs thereof are opposite to each other. Accordingly, fh_max* satisfying the following expression (11) may be frequency of new pulsating voltage application commands and fh_max* multiplied by a multiple 2n of the period of the application voltage to f_PWM is newly set as f_PWM newly. Further, the new pulse width modulation command values Vu, Vv and Vw** may be calculated from the following expression (12).

$$(Vu*-Vv*) \times fh* = Vpn \times fh\_max* \quad (11)$$

$$Vu** = Vpn \times \text{sign}(Vu*)(=0) \quad (12\text{-}1)$$

$$Vv** = Vpn \times \text{sign}(Vv*) \quad (12\text{-}2)$$

$$Vw** = Vpn \times \text{sign}(Vw*)(=-Vv**) \quad (12\text{-}3)$$

The qc-axis current Iqc shown in FIG. 17(j) is calculated on the basis of the DC current Ish and SAH. The magnetic pole position presumption means 12 treats the qc-axial current Iqc as an input value Idc and makes the same calculation as in the case of Vhq*=0 to thereby obtain the position error Δθ with regard to the qc-axial direction.

Figure 19:
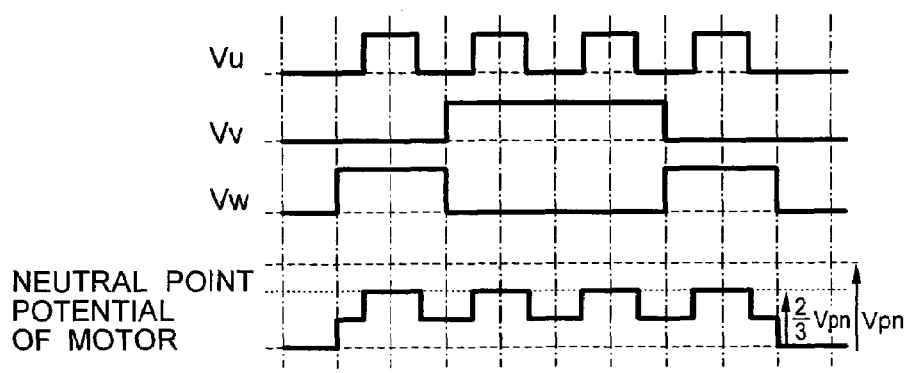
FIG. 19 is a waveform diagram showing neutral point potential of the motor in the third embodiment of the present invention.

FIG. 19 is a diagram showing waveforms of the phase output voltage commands Vu, Vv and Vw and the neutral point potential of the PM motor 3 in the third embodiment. The neutral point potential of the PM motor 3 is changed with an amplitude equal to two thirds of the voltage Vpn of the DC voltage supply 23 in response to the phase output voltages. Since radiation noise is increased when the neutral point potential is changed largely, the electromagnetic noise can be reduced in the embodiment as compared with the embodiment 1.

As in the embodiment, when the phase voltage outputs is changed, the number of operations of the main circuit 21 of the power converter 2 is suppressed while making the same position presumption as in the first embodiment and accordingly the electromagnetic noise is reduced. Further, the pulse width modulation frequency can be increased to thereby shorten the time required for the position presumption.

Embodiment 4

A fourth embodiment of the present invention is now described. The system configuration thereof is the same as that of the first embodiment shown in FIG. 1. The generation method of the phase output voltage commands Vu, Vv and Vw and operation of the magnetic pole position presumption means 12 in the embodiment are different from those of the first embodiment.

Figure 20:
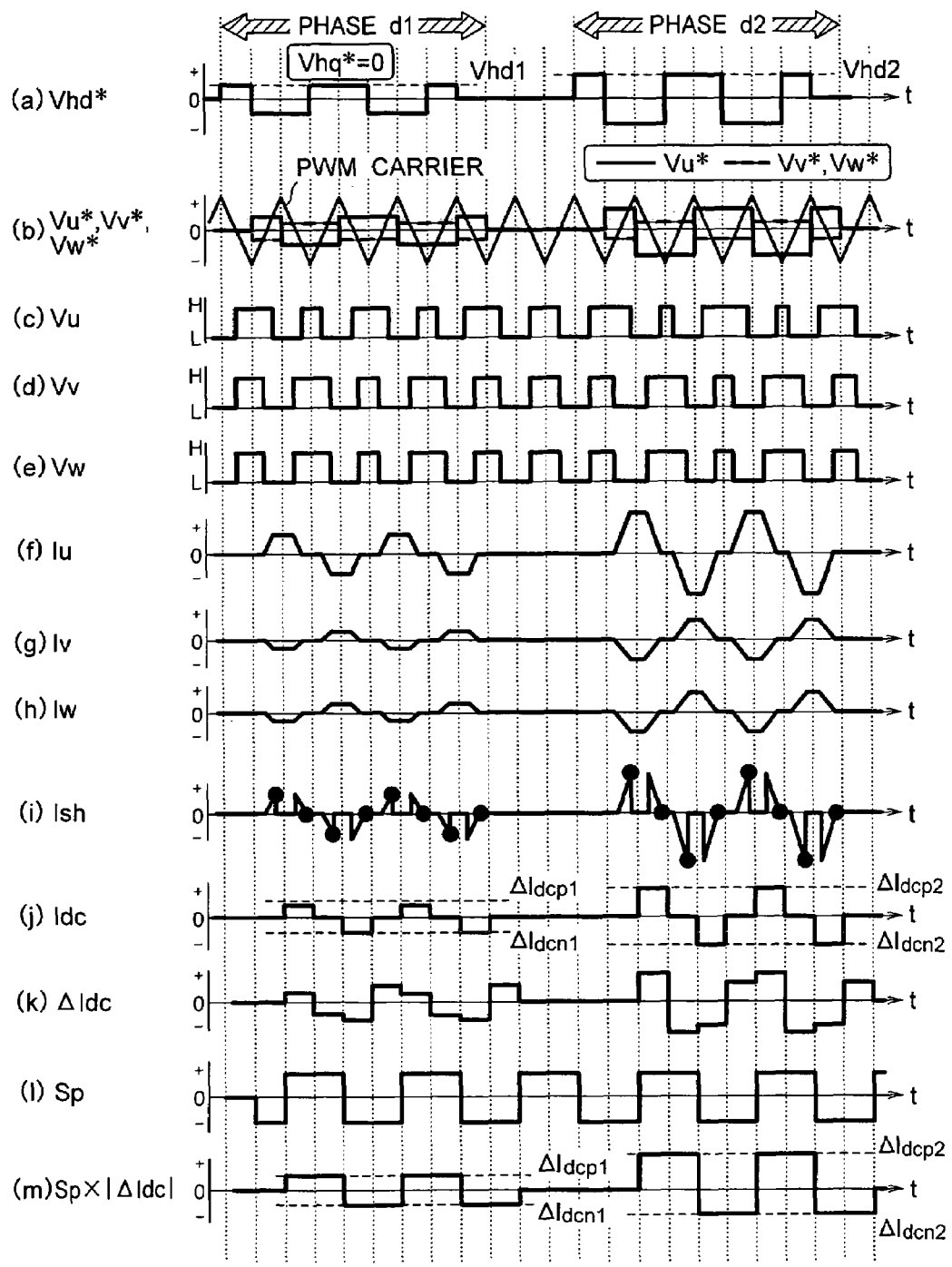
FIG. 20 is a waveform diagram showing operation of each portion in case where a voltage is applied to a dc-axis in the magnetic pole position presumption in a fourth embodiment of the present invention.
Figure 21:
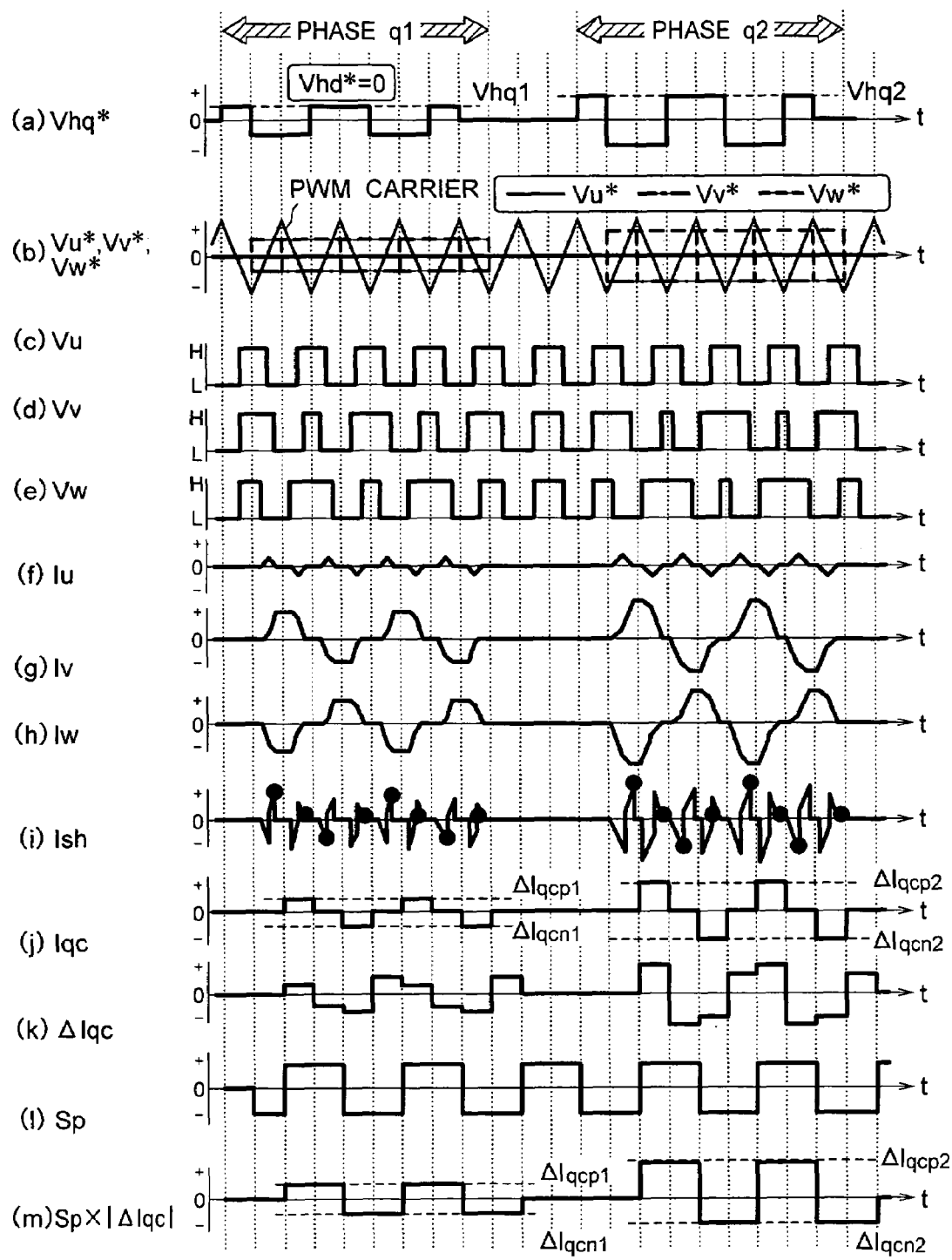
FIG. 21 is a waveform diagram showing operation of each portion in case where a voltage is applied to a qc-axis in the magnetic pole position presumption in the fourth embodiment of the present invention.

FIG. 20 shows operation waveforms in the embodiment in case where the signal voltage command is applied to only the dc-axis (Vhd*=0) and FIG. 21 shows operation waveforms in the embodiment in case where the signal voltage command is applied to only the qc-axis (Vhd*=0). In the embodiment, the magnetic pole position presumption operation is performed in two parts as shown in FIGS. 20 and 21 and two square wave voltages having different amplitudes are successively supplied as the application voltage commands Vhd* and Vhq*. In other words, as shown in FIG. 20(b), when the signal voltage command is applied to the dc-axis, the application voltage command Vhd* has an amplitude of Vhd1' in the phase d1 and has an amplitude of Vhd2' in the phase d2. Further, as shown in FIG. 21(b), when the signal voltage command is applied to the qc-axis, the application voltage command Vhq* has an amplitude of Vhq1' in the phase q1 and has an amplitude of Vhq2' in the phase q2. The period thereof is twice the period of the triangular wave carrier in either case. The following description is made for the case of Vhq*=0. In the embodiment, the dc-axis current Idc is calculated for each phase.

The current detection timing set signal SAH used in the dq converter 5 is prepared as current detection phase information from the phase output voltage commands Vu, Vv and Vw produced by the PWM modulation means 9 in accordance with FIG. 5 in the same manner as in the first embodiment and the current detection timing is supposed to be the timing that the output voltages of the power converter 2 are changed to zero vector. The current detection timing at this time is shown by black spots in FIG. 20(i). At this time, ΔIdcp1 and ΔIdcn1 are obtained in the phase d1 and ΔIdcp2 and ΔIdcn2 are obtained in the phase d2.

Figure 22:
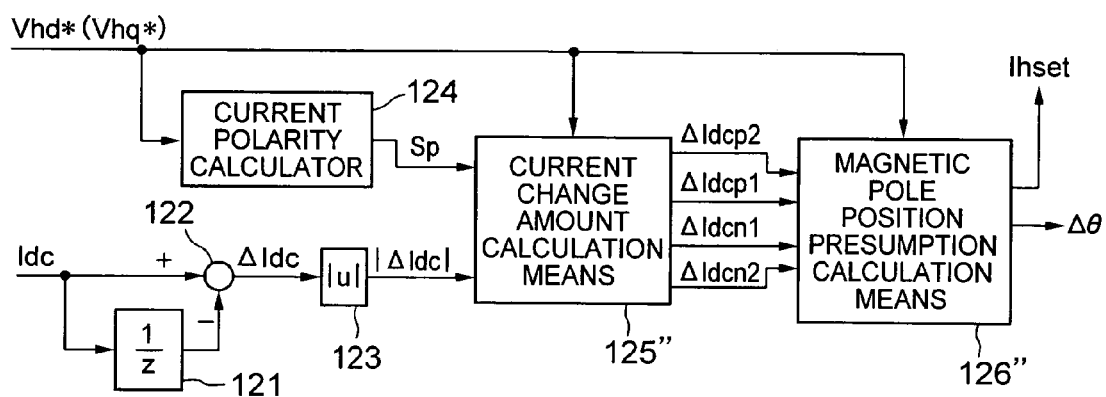
FIG. 22 is a functional block diagram illustrating magnetic pole position presumption means in the fourth embodiment of the present invention.

FIG. 22 is a definite functional block diagram illustrating the magnetic pole position presumption means 12 based on the detected current value in the embodiment. In the embodiment, the delay unit 121, the adder 122, the absolute value calculator 123 are operated in the same manner as in the first embodiment. The current polarity signal Sp produced by the current polarity calculator 124 is delayed by one control period as compared with Vhd* and its polarity is reversed. In the embodiment, the result of the absolute value |ΔIdc| multiplied by the current polarity signal Sp in each phase does not contain information of |ΔIdcp'| and |ΔIdcn'|. Instead, ΔIdcp1, ΔIdcn1, ΔIdcp2 and ΔIdcn2 which are the change amounts of the dc-axis current Idc in each phase are understood. A current change amount calculation means 125" calculatesΔIdcp1 and ΔIdcn1 in the phase d1 and ΔIdcp2 and ΔIdcn2 in the phase d2 as the result of multiplying the absolute value |ΔIdc| by the current polarity signal Sp and supplies them to a magnetic pole position presumption means 126". The magnetic pole position presumption means 126" calculates |ΔIdcp'| and |ΔIdcn'| and presumes the magnetic pole position after both of the phases d1 and d2 have been completed.

In the embodiment, Vhd1' and Vhd2' can be set independently. Accordingly, ΔIdcp1 and ΔIdcn1 can be set so that change in inductance due to structure of the stator and the like does not have an influence thereon without changing peak values ΔIdcp2 and ΔIdcn2 of the dc-axis current Idc and the presumption accuracy of the position error Δθ can be enhanced without increasing the dc-axis current Idc. Further, ΔIdcp1 and ΔIdcn1 are equal to positive-side and negative-side peak values of the dc-axis current Idc in the phase d1, respectively, and ΔIdcp2 and ΔIdcn2 are equal to positive-side and negative-side peak values of the dc-axis current Idc in the phase d2, respectively. Accordingly, ΔIdcp' and ΔIdcn' can be also calculated from the expression (1) while using positive-side and negative-side detected values in the respective phases as ΔIdcp1, ΔIdcn1, ΔIdcp2 and ΔIdcn2 without calculating the first-degree difference value and in this case the calculation processing can be simplified.

In case of Vhd*=0, Vhd1' and Vhd2' are replaced by Vhq1' and Vhq2', respectively, and thereafter the same operation as in case of Vhq*=0 may be made. The qc-axis current Iqc shown in FIG. 20(i) is calculated and is treated as an input value Idc in the magnetic pole position presumption means 12. Then, the same operation as in case of Vhq*=0 may be made. In other words, ΔIqcp1 and ΔIqcn1 are calculated in the phase q1 and ΔIqcp2 and ΔIqcn2 are calculated in the phase q2, so that the position error Δθ is obtained within the range of ±π/2 with regard to the qc-axis direction. Accordingly, in the same manner as the first embodiment, the dc-axis and the qc-axis of two orthogonal directions are combined to make it possible to presume the position error Δθ.

Further, when the same change as in the second or third embodiment is applied to the application voltage commands Vhd*, Vhq* and the frequency command fh* thereof in the embodiment, the effects in the respective embodiments can be attained and electromagnetic noise can be reduced. Further, the time required for position presumption can be reduced as in the third embodiment.

In the first to third embodiments, the period of the signal voltage commands Vhd* and Vhq* on the dc- and qc-axes is set to be four times as long as the period of the triangular wave carrier. In this case, if there is no change in inductance due to the magnetic saturation, the magnitude of ΔIdcp1 and ΔIdcn1 are limited to about half of the magnitude of ΔIdcp2 and ΔIdcn2. In order to select the magnitude of ΔIdcp1 and Δdcn1 and the magnitude of ΔIdcp2 and ΔIdcn2 independently, the signal voltage commands Vhd* and Vhq* may be selected as follows. First, the period of the signal voltage commands Vhd* and Vhq* may be any as far as it is 2n (n is an integer equal to or larger than 2) times as long as the triangular wave carrier. At this time, the DC current Ish can be detected 8n times or more within one period of the signal voltage commands Vhd* and Vhq*. The timing for obtaining each of the ΔIdcp1, ΔIdcn1, ΔIdcp2 and ΔIdcn2 may be selected by the current change amount calculation means on the basis of the signal voltage commands Vhd* and Vhq*. Alternatively, the signal voltage commands Vhd* and Vhq* may be stepwise wave having an amplitude changing in each control period. In this case, ΔIdcp1, ΔIdcn1, ΔIdcp2 and ΔIdcn2 can be changed independently in accordance with an amplitude in each control period of the signal voltage commands Vhd* and Vhq*.

Further, in the embodiments of the present invention, the pulse width modulation system is adopted in which comparison with the single triangular wave carrier is made, although the present invention is not limited to the pulse width modulation system. Further, the phase at which the voltage is applied to generate the pulsating current is not limited to the phase as described above since the processing can be effective for any phase of the PM motor 3 if the dc-axis position in the initial state is changed.

As described above, according to the PM motor driving apparatus of the embodiments of the present invention, the voltage can be applied to the PM motor and the magnetic pole position in the PM motor can be presumed on the basis of the current change rate calculated from two or more different current values on the positive and negative sides of the current pulsating component generated in response to the application of the voltage.

Further, since change of the pulsating component due to the magnetic saturation of the PM motor is utilized and the component generated depending on the structure of the PM motor of the pulsating component is removed, the present invention can be applied regardless of the structure of the PM motor and the presumption accuracy of the magnetic pole position can be enhanced without increasing the amplitude of the pulsating current.

Moreover, the provision of the externally setting function or the automatic adjustment function in the controller for change of the voltage can detect the magnetic pole position even if the PM motor is changed and the controller is provided with the abnormality detection function to thereby make it possible to prevent malfunction of the presumption operation of the magnetic pole position including the automatic adjustment function.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A synchronous motor driving apparatus comprising:
   a synchronous motor;
   a power converter for supplying AC variable voltages having variable frequency to said synchronous motor;
   pulsating current application means for applying voltages to said synchronous motor through said power converter to supply pulsating currents thereto;
   means for detecting DC current flowing through said power converter upon supply of said pulsating currents; and
   magnetic pole position presumption means for presuming a magnetic pole position of said synchronous motor on the basis of the detection result of the DC current, wherein said magnetic pole position presumption means comprises current detection means for detecting currents in at least two different phases on each of positive and negative sides of the DC current and means for presuming the magnetic pole position of said synchronous motor on the basis of the relation in magnitude between two current values on each of the positive and negative sides.

2. A synchronous motor driving apparatus according to claim 1, comprising means for calculating current change rates on the positive and negative sides on the basis of the two current values on each of the positive and negative sides and presuming the magnetic pole position of said synchronous motor on the basis of a difference between said current change rates on the positive and negative sides.

3. A synchronous motor driving apparatus according to claim 1, wherein said pulsating current application means includes means for producing square-wave voltages to supply them to said power converter.

4. A synchronous motor driving apparatus according to claim 1, wherein said pulsating current application means applies square-wave voltages to said synchronous motor by means of pulse width modulation of said power converter and holds at least one-phase output voltage of three-phase output voltages to be positive (maximum value) or negative (minimum value) during each half-period of a carrier for the pulse width modulation.

5. A synchronous motor driving apparatus according to claim 1, wherein said pulsating current application means applies square-wave voltages to said synchronous motor by means of pulse width modulation of said power converter and holds at least one-phase output voltage of three-phase output voltages to be positive (maximum value) and at least remaining one-phase output voltage to be negative (minimum value) during one period of the pulse width modulation.

6. A synchronous motor driving apparatus according to claim 1, wherein said pulsating current application means subjects said power converter to pulse width modulation and applies square-wave voltages to said synchronous motor and said current detection means detects two DC current values in two different phases within a period that each of three-phase output voltages of said power converter is held to be positive (maximum value) or negative (minimum value).

7. A synchronous motor driving apparatus according to claim 1, wherein said current detection means detects the DC current near the timing that all of three-phase output voltages of said power converter are changed to be positive (maximum value) or negative (minimum value).

8. A synchronous motor driving apparatus according to claim 1, wherein said current detection means detects the DC current near the timing that at least one-phase output voltage of said power converter is changed from the state that all of the three-phase output voltages of the power converter are positive (maximum value) or negative (minimum value).

9. A synchronous motor driving apparatus according to claim 6, wherein said DC current detection means sets one current detection timing to be near the timing that all of three-phase output voltages of the power converter are changed to be positive (maximum value) or negative (minimum value).

10. A synchronous motor driving apparatus according to claim 1, comprising voltage command setting changing means for setting or changing an amplitude of an application voltage command of said pulsating current application means.

11. A synchronous motor driving apparatus according to claim 1, comprising abnormality detection means for detecting abnormality of said power converter and a controller thereof and wherein said means for presuming the magnetic pole position of said synchronous motor is operated after said abnormality detection means makes detection processing.

12. A synchronous motor driving apparatus comprising:
   a synchronous motor;
   a power converter for supplying AC variable voltages having variable frequency to said synchronous motor;

pulsating current application means for applying voltages to said synchronous motor through said power converter to supply pulsating currents thereto;

current detection means for detecting DC current flowing through said power converter upon supply of the pulsating currents; and magnetic pole position presumption means for presuming a magnetic pole position of said synchronous motor on the basis of the detection result of the DC current, wherein said magnetic pole position presumption means comprises means for detecting current change rates on positive and negative sides of the DC current and means for presuming the magnetic pole position of the synchronous motor on the basis of the relation in magnitude between said current change rates on the positive and negative sides.

13. A synchronous motor driving apparatus according to claim 12, wherein said-pulsating current application means subjects said power converter to pulse width modulation and applies square-wave voltages to said synchronous motor and said current detection means includes means for detecting two DC current values in two different phases within a period that each of three-phase output voltages of said power converter is held to be positive (maximum value) or negative (minimum value) and means for calculating said current change rates on the basis of the two detected current values.

14. A synchronous motor driving apparatus according to claim 12, wherein said current detection means detects the DC current near the timing that all of three-phase output voltages of said power converter are changed to be positive (maximum value) or negative (minimum value).

15. A synchronous motor driving apparatus according to claim 12, wherein said current detection means detects the DC current near the timing that at least one-phase output voltage of said power converter is changed from the state that all of the three-phase output voltages of said power converter are positive (maximum value) or negative (minimum value).

16. A synchronous motor driving apparatus according to claim 13, wherein said current detection means sets one current detection timing to be near the timing that all of three-phase output voltages of the power converter are changed to be positive (maximum value) or negative (minimum value).

17. A synchronous motor driving apparatus according to claim 12, comprising voltage command setting changing means for setting or changing an amplitude of an application voltage command of said pulsating current application means.

18. A synchronous motor driving apparatus according to claim 12, comprising abnormality detection means for detecting abnormality of said power converter and a controller thereof and wherein said means for presuming the magnetic pole position of said synchronous motor is operated after said abnormality detection means makes detection processing.

19. A synchronous motor driving apparatus comprising:

a synchronous motor;

a power converter for supplying AC variable voltages having variable frequency to said synchronous motor;

pulsating current application means for applying voltages to said synchronous motor through said power converter to supply pulsating currents thereto;

means for detecting DC current flowing through said power converter upon supply of the pulsating currents; and magnetic pole position presumption means for presuming a magnetic pole position of said synchronous motor on the basis of the detection result of the DC current, wherein said pulsating current application means successively generates at least two square-wave voltages having different amplitudes to supply the voltages to said power converter and said magnetic pole position presumption means presumes the magnetic pole position of said synchronous motor on the basis of detected values of two DC currents upon application of each of the at least two square-wave voltages.

20. A synchronous motor driving apparatus according to claim 19, wherein said pulsating current application means applies the at least two square-wave voltages having different amplitudes to two directions of a dc-axis constituting a presumption magnetic flux-axis of a motor controller and a qc-axis orthogonal to the dc-axis at intervals of predetermined period.

* * * * *